United States Patent
White et al.

(10) Patent No.: US 7,761,864 B2
(45) Date of Patent: Jul. 20, 2010

(54) METHOD, APPARATUS AND ARTICLE TO LOAD NEW INSTRUCTIONS ON PROCESSOR BASED DEVICES, FOR EXAMPLE, AUTOMATIC DATA COLLECTION DEVICES

(75) Inventors: Allen S. White, Snohomish, WA (US); Art Millican, Granite Falls, WA (US); Joel Dale, Seattle, WA (US)

(73) Assignee: Intermec IP Corp., Everett, WA (US)

( * ) Notice: Subject to any disclaimer, the term of this patent is extended or adjusted under 35 U.S.C. 154(b) by 1179 days.

(21) Appl. No.: 11/200,503

(22) Filed: Aug. 9, 2005

(65) Prior Publication Data

US 2007/0038990 A1     Feb. 15, 2007

(51) Int. Cl.
    *G06F 9/44* (2006.01)
(52) U.S. Cl. .............. 717/168; 717/169; 717/170; 717/171; 717/172; 717/173
(58) Field of Classification Search ......... 717/168–173; 713/1, 2, 100
    See application file for complete search history.

(56) References Cited

U.S. PATENT DOCUMENTS

| | | | |
|---|---|---|---|
| 3,787,670 A | 1/1974 | Nelson et al. | 235/153 |
| 4,527,237 A | 7/1985 | Frieder et al. | 364/200 |
| 4,801,786 A | 1/1989 | Stobbe | 235/377 |
| 4,825,058 A | 4/1989 | Poland | 235/472 |
| 5,034,575 A | 7/1991 | Poland | 235/435 |
| 5,036,479 A | 7/1991 | Prednis et al. | 364/580 |
| 5,052,020 A | 9/1991 | Koenck et al. | 375/62 |
| 5,070,536 A | 12/1991 | Mahany et al. | 455/67 |
| 5,121,342 A | 6/1992 | Szymborski et al. | 364/514 |
| 5,164,982 A | 11/1992 | Davis | 379/96 |
| 5,218,188 A | 6/1993 | Hanson | 235/375 |
| 5,241,625 A | 8/1993 | Epard et al. | 395/163 |
| 5,261,079 A | 11/1993 | Celi, Jr. | 395/500 |

(Continued)

FOREIGN PATENT DOCUMENTS

EP     0809176 B1     10/2003

(Continued)

OTHER PUBLICATIONS

Browne, et al. "Zeus: An Object-Oriented Distributed Operating System for Reliable Appplications", 1984, ACM, p. 179-188.*

(Continued)

*Primary Examiner*—Wei Y Zhen
*Assistant Examiner*—Qamrun Nahar
(74) *Attorney, Agent, or Firm*—Seed IP Law Group PLLC

(57) ABSTRACT

Methods, apparatus and articles facilitate the loading of a set of new instructions to replace set of existing instructions on a processor based device, for example an automatic data collection device. For example, a new operating system may replace an existing operating system using an executable that disables interrupts and/or exceptions. The new operating system may execute with, or without booting. The set of new instructions may be fragmented to fit the block size of a nonvolatile programmable memory, and/or may be compressed. Validation values such as check sums and/or error correction may be employed.

43 Claims, 13 Drawing Sheets

U.S. PATENT DOCUMENTS

| | | | | |
|---|---|---|---|---|
| 5,295,154 | A | | 3/1994 | Meier et al. ............... 375/1 |
| 5,309,351 | A | | 5/1994 | McCain et al. ............. 364/132 |
| 5,349,678 | A | | 9/1994 | Morris et al. ............. 395/800 |
| 5,365,546 | A | | 11/1994 | Koenck et al. ............. 375/9 |
| 5,404,493 | A | | 4/1995 | Bolme et al. ............. 395/500 |
| 5,408,624 | A | * | 4/1995 | Raasch et al. ............. 717/173 |
| 5,418,684 | A | | 5/1995 | Koenck et al. ............. 361/680 |
| 5,425,051 | A | | 6/1995 | Mahany ............. 375/202 |
| 5,440,564 | A | | 8/1995 | Ovada et al. ............. 370/112 |
| 5,453,933 | A | | 9/1995 | Wright et al. ............. 364/474.23 |
| 5,471,596 | A | | 11/1995 | Brown, III ............. 395/375 |
| 5,490,252 | A | | 2/1996 | Macera et al. ............. 395/200.01 |
| 5,493,213 | A | | 2/1996 | Collins, Jr. et al. ............. 324/158.1 |
| 5,497,450 | A | | 3/1996 | Helmbold et al. ............. 395/114 |
| 5,515,508 | A | | 5/1996 | Pettus et al. ............. 395/200.01 |
| 5,564,070 | A | | 10/1996 | Want et al. ............. 455/53.1 |
| 5,572,512 | A | | 11/1996 | Cutler, Jr. et al. ............. 370/13 |
| 5,572,674 | A | | 11/1996 | Ernst ............. 395/200.1 |
| 5,577,229 | A | | 11/1996 | Wakerly ............. 395/474 |
| 5,579,367 | A | | 11/1996 | Raymond et al. ............. 379/1 |
| 5,586,281 | A | | 12/1996 | Miyama et al. ............. 395/405 |
| 5,602,742 | A | | 2/1997 | Solondz et al. ............. 364/464.2 |
| 5,604,516 | A | | 2/1997 | Herrod et al. ............. 345/168 |
| 5,610,595 | A | | 3/1997 | Garrabrant et al. ............. 340/825.52 |
| 5,613,160 | A | | 3/1997 | Kraslavsky et al. ............. 395/836 |
| 5,623,603 | A | | 4/1997 | Jiang et al. ............. 395/200.04 |
| 5,623,604 | A | | 4/1997 | Russell et al. ............. 395/200.1 |
| 5,627,970 | A | | 5/1997 | Keshav ............. 395/200.13 |
| 5,640,002 | A | | 6/1997 | Ruppert et al. ............. 235/472 |
| 5,640,595 | A | | 6/1997 | Baugher et al. ............. 395/830 |
| 5,650,940 | A | | 7/1997 | Tonozuka et al. ............. 364/514 C |
| 5,673,385 | A | | 9/1997 | Mack et al. ............. 395/183.2 |
| 5,687,971 | A | | 11/1997 | Khaladkar ............. 273/269 |
| 5,719,882 | A | | 2/1998 | Ellis ............. 371/33 |
| 5,724,510 | A | | 3/1998 | Arndt et al. ............. 395/200.5 |
| 5,727,142 | A | | 3/1998 | Chen ............. 395/181 |
| 5,742,762 | A | | 4/1998 | Scholl et al. ............. 395/200.3 |
| 5,748,884 | A | | 5/1998 | Royce et al. ............. 395/185.1 |
| 5,751,719 | A | | 5/1998 | Chen et al. ............. 370/473 |
| 5,761,428 | A | | 6/1998 | Sidey ............. 395/200.53 |
| 5,799,317 | A | | 8/1998 | He et al. ............. 707/104 |
| 5,802,293 | A | | 9/1998 | van der Sijpt ............. 395/200.33 |
| 5,819,097 | A | * | 10/1998 | Brooks et al. ............. 717/141 |
| 5,857,190 | A | | 1/1999 | Brown ............. 707/10 |
| 5,860,068 | A | | 1/1999 | Cook ............. 705/26 |
| 5,893,083 | A | | 4/1999 | Eshghi et al. ............. 706/45 |
| 5,919,248 | A | | 7/1999 | Kahkoska et al. ............. 709/224 |
| 5,930,515 | A | * | 7/1999 | Ducharme et al. ............. 717/169 |
| 5,943,503 | A | | 8/1999 | Kai ............. 395/839 |
| 5,961,594 | A | | 10/1999 | Bouvier et al. ............. 709/223 |
| 5,969,326 | A | | 10/1999 | Ogami ............. 235/462.27 |
| 5,974,237 | A | | 10/1999 | Shurmer et al. ............. 395/200.54 |
| 5,979,757 | A | | 11/1999 | Tracy et al. ............. 235/383 |
| 5,982,753 | A | | 11/1999 | Pendleton et al. ............. 370/252 |
| 5,991,806 | A | | 11/1999 | McHann, Jr. ............. 709/224 |
| 5,999,948 | A | | 12/1999 | Nelson et al. ............. 707/506 |
| 6,006,034 | A | | 12/1999 | Heath et al. ............. 395/712 |
| 6,027,024 | A | | 2/2000 | Knowles ............. 235/472.01 |
| 6,028,605 | A | | 2/2000 | Conrad et al. ............. 345/354 |
| 6,041,041 | A | | 3/2000 | Ramanathan et al. ............. 370/241 |
| 6,047,128 | A | * | 4/2000 | Zander ............. 717/173 |
| 6,073,169 | A | | 6/2000 | Shuey et al. ............. 709/217 |
| 6,094,679 | A | | 7/2000 | Teng et al. ............. 709/220 |
| 6,102,295 | A | | 8/2000 | Ogami ............. 235/472.01 |
| 6,108,782 | A | | 8/2000 | Fletcher et al. ............. 713/153 |
| 6,119,941 | A | | 9/2000 | Katsandres et al. ............. 235/462.07 |
| 6,122,664 | A | | 9/2000 | Boukobza et al. ............. 709/224 |
| 6,151,643 | A | | 11/2000 | Cheng et al. ............. 710/36 |
| 6,154,378 | A | | 11/2000 | Peterson et al. ............. 363/37 |
| 6,154,465 | A | | 11/2000 | Pickett ............. 370/466 |
| 6,161,123 | A | | 12/2000 | Renouard et al. ............. 709/203 |
| 6,163,802 | A | | 12/2000 | Lin et al. ............. 709/217 |
| 6,167,567 | A | * | 12/2000 | Chiles et al. ............. 717/173 |
| 6,170,015 | B1 | | 1/2001 | Lavian ............. 709/232 |
| 6,175,868 | B1 | | 1/2001 | Lavian et al. ............. 709/223 |
| 6,178,426 | B1 | | 1/2001 | Klein et al. ............. 707/102 |
| 6,195,171 | B1 | | 2/2001 | Ochiai ............. 358/1.15 |
| 6,199,753 | B1 | | 3/2001 | Tracy et al. ............. 235/375 |
| 6,226,675 | B1 | | 5/2001 | Meltzer et al. ............. 709/223 |
| 6,229,540 | B1 | | 5/2001 | Tonelli et al. ............. 345/356 |
| 6,240,082 | B1 | | 5/2001 | Kim et al. ............. 370/342 |
| 6,243,105 | B1 | | 6/2001 | Hoyer et al. ............. 345/440 |
| 6,263,387 | B1 | | 7/2001 | Chrabaszcz ............. 710/103 |
| 6,269,330 | B1 | | 7/2001 | Cidon et al. ............. 704/43 |
| 6,272,537 | B1 | | 8/2001 | Kekic et al. ............. 709/223 |
| 6,285,889 | B1 | | 9/2001 | Nykanen et al. ............. 455/557 |
| 6,289,501 | B1 | | 9/2001 | Mutschler, III ............. 717/1 |
| 6,305,605 | B1 | | 10/2001 | Goetz et al. ............. 235/385 |
| 6,308,205 | B1 | | 10/2001 | Carcerano et al. ............. 709/221 |
| 6,321,348 | B1 | | 11/2001 | Kobata ............. 714/37 |
| 6,321,991 | B1 | | 11/2001 | Knowles ............. 235/472.01 |
| 6,321,992 | B1 | | 11/2001 | Knowles et al. ............. 235/478.01 |
| 6,330,597 | B2 | | 12/2001 | Collin et al. ............. 709/220 |
| 6,335,795 | B1 | | 1/2002 | Neuhard et al. ............. 358/1.15 |
| 6,356,949 | B1 | | 3/2002 | Katsandres et al. ............. 709/238 |
| 6,360,255 | B1 | | 3/2002 | McCormack et al. ............. 709/221 |
| 6,378,069 | B1 | | 4/2002 | Sandler et al. ............. 713/153 |
| 6,389,464 | B1 | | 5/2002 | Krishnamurthy et al. ............. 709/220 |
| 6,398,105 | B2 | | 6/2002 | Ramberg et al. ............. 235/375 |
| 6,409,661 | B1 | | 6/2002 | Murphy ............. 600/300 |
| 6,457,883 | B1 | | 10/2002 | Silverbrook et al. ............. 400/62 |
| 6,460,070 | B1 | | 10/2002 | Turek et al. ............. 709/202 |
| 6,473,788 | B1 | | 10/2002 | Kim et al. ............. 709/209 |
| 6,473,798 | B1 | | 10/2002 | Grosser, Jr. et al. ............. 709/224 |
| 6,487,566 | B1 | | 11/2002 | Sundaresan ............. 707/513 |
| 6,488,209 | B1 | | 12/2002 | Hunt et al. ............. 235/462.15 |
| 6,507,856 | B1 | | 1/2003 | Chen et al. ............. 707/513 |
| 6,539,422 | B1 | | 3/2003 | Hunt et al. ............. 709/217 |
| 6,540,142 | B1 | | 4/2003 | Alleshouse ............. 235/462.01 |
| 6,568,596 | B1 | | 5/2003 | Shaw ............. 235/462.01 |
| 6,587,684 | B1 | | 7/2003 | Hsu et al. ............. 455/419 |
| 6,597,465 | B1 | | 7/2003 | Jarchow et al. ............. 358/1.12 |
| 6,614,804 | B1 | | 9/2003 | McFadden et al. ............. 370/468 |
| 6,618,162 | B1 | | 9/2003 | Wiklof et al. ............. 358/1.15 |
| 6,655,593 | B2 | | 12/2003 | Alleshouse ............. 235/462.01 |
| 6,764,009 | B2 | | 7/2004 | Melick et al. ............. 235/462.01 |
| 6,857,013 | B2 | | 2/2005 | Ramberg et al. ............. 709/223 |
| 6,908,034 | B2 | | 6/2005 | Alleshouse ............. 235/432 |
| 6,976,062 | B1 | | 12/2005 | Denby et al. ............. 709/220 |
| 2002/0029229 | A1 | * | 3/2002 | Jakopac et al. ............. 707/500 |
| 2003/0058469 | A1 | | 3/2003 | Buis et al. ............. 358/1.15 |
| 2004/0236874 | A1 | * | 11/2004 | Largman et al. ............. 710/8 |
| 2005/0257215 | A1 | | 11/2005 | Denby et al. ............. 717/172 |
| 2005/0274801 | A1 | | 12/2005 | Harding et al. ............. 235/438 |
| 2006/0225060 | A1 | * | 10/2006 | Goyan ............. 717/151 |
| 2006/0282815 | A1 | * | 12/2006 | Yodaiken et al. ............. 717/101 |
| 2008/0028035 | A1 | * | 1/2008 | Currid et al. ............. 709/217 |

FOREIGN PATENT DOCUMENTS

| | | |
|---|---|---|
| JP | 2002-103746 | 4/2002 |
| WO | 97/26750 | 7/1997 |

OTHER PUBLICATIONS

U.S. Appl. No. 08/852,002, filed May 6, 1997, Renourd et al.

"Data Transmission Systems and Equipment—Serial Asynchronous Automatic Dialing and Control for Character Mode DCE on Wireless Data Services", PCCA Standard, PCCA STD-101, Official Standard—Issue A, Jun. 1995, pp. 1-105.

"Disk Drive with Embedded Hyper-Text Markup Language Server", *IBM Technical Disclosure Bulletin*, vol. 38, No. 12, Dec. 1995.

"How WRQ's TCP/IP Reduces Costs and Improves Reliability in Remote and Mobile Computing", URL=http://web.archive.org/web/19970719155455/www.wrq.com/whitepap/remote1/remote1.htm, download date Jun. 19, 2007.

"Intel and Nokia Extend Internet with Open Short Messaging Technology", Sep. 18, 1996, URL=http://press.nokia.com/PR/199609/776243_5.html, download date Jun. 25, 2007.

"Mobile Connectivity Committee", Portable Computer and Communications Association, 1997 URL=http://web.archive.org/web/19981205001354/http://www.pcca.org/mobilecom/index.html, download date Jun. 19, 2007.

"Narrowband Socket Specification, Revision 1.0", Intel Corporation, Nokia Telecommunications, Mar. 7, 1997.

"Narrowband Sockets", URL=http://web.archive.org/web/19990209131352/www.intel.com/ial/nbs/, download date Jun. 19, 2007.

"Network File System", URL=http://www.uwsg.indiana.edu/usail/network/nfs/overview.html, download date Jun. 14, 2007.

Portable Computer and Communications Association, URL=http://www.pcca.org, download date Jun. 14, 2007.

"PCCA Mobile Connectivity '97", Portable Computer and Communications Association, 1997 URL=http://web.archive.org/web/19981202091121/http://www.pcca.org/connectivity/index.html, download date Jun. 19, 2007.

Ram Mobile Data and Ericsson have teamed up for NDIS Driver Development, Portable Computer and Communications Association, URL=http://web.archive.org/web/19990220121111/http://www.pcca.org/articles/cancel.html, download date Jun. 19, 2007.

The Standards Committee, Portable Computer and Communications Association, Nov. 1997, URL=http://web.archive.org/web/19981203125611/http://www.pcca.org/standards-com/index.html, download date Jun. 19, 2007.

"Wireless Data Developer Program", Portable Computer and Communications Association, Modem Standards Committee, 2 pages, Feb. 1, 1998.

"WRQ White Papers and Technology Updates", URL=http://web.archive.org/web/19970719140005/http://www.wrq.com/wpindex.htm, download date Jun. 19, 2007.

Adams, Norman et al., "An Infared Network for Mobile Computers",Proc. of the USENIX Symposium on Mobile and Location-Independent Computing, Cambridge, Massachusetts, Aug. 1993.

Amir, Elan et al., "Efficient TCP over Networks with Wireless Links",Proc. $5^{th}$ Wrkshp on Hot Topics in Operating Systems, IEEE, May 1995, pp. 35-40.

Athan, Andrew et al., "Agent-Mediated Message Passing for Constrained Environments", Computer Science Department, Columbia University, pp. 1-5.

Badrinath, B.R. et al., "Handling Mobile Clients: A Case for Indirect Interaction", Proc. of $4^{th}$ Wkshp on Workstation Operating Systems (WWOS-IV), IEEE, Oct. 14-15, 1993, pp. 91-97.

Badrinath, B.R. et al., "Structuring Distributed Algorithms for Mobile Hosts", Department of Computer Science, Rutgers University, New Brunswick, New Jersey, pp. 1-12.

Bakre, Ajay V., "Design and Implementation of Indirect Protocols for Mobile Wireless Environments", Doctoral Dissertation, Rutgers University, New Brunswick, New Jersey, Oct. 1996, pp. i-xvi, 1-175.

Bakre, Ajay et al., "Handoff and System Support for Indirect TCP/IP", Piscataway, New Jersey, Proc. $2^{nd}$ Symposium on Mobile and Location-Independent Computing, USENIX, Apr. 1995, pp. 1-14.

Bakre, Ajay et al., "M-RPC: A Remote Procedure Call Service for Mobile Clients", Department of Computer Science, Rutgers University, Piscataway, New Jersey, pp. 1-13.

Bender, Micheal et al., "UNIX for Nomads: Making Unix Support Mobile Computing",Proc. of the USENIX Mobile & Location-Independent Computing Symposium, Nomadic Systems Group, Cambridge, Massachusetts, Aug. 2-3, 1993, pp. 1-18.

Bhagwat, Pravin et al., "Network Layer Mobility: An Architecture and Survey",IEEE Personal Communications, Jun. 1996, pp. 54-64.

Brown, Kevin et al., "M-UDP: UDP for Mobile Cellular Networks", Department of Computer Science, University of Southern Carolina, Columbia, South Carolina, Sep. 4, 1996, pp. 1-19.

Burke, Chris, "Making the Corporate Connection: The Key to HPC Success",Portable Computer and Communication Association, URL=http://web.archive.org/web/19981207004108/http://www.pcca.org/articles/burke.html, download date Jun. 19, 2007.

Burke, Chris, "Wireless and/or Remote Connectivity for Handheld Personal Computers (h/PCs)", PCCA Discussion Paper, 1996, URL=http://web.archive.org/web/19990220123853/http://www.pcca.org/articles/hobbs.html, download date Jun. 19, 2007.

Cáceres, Ramón et al., "The Effects of Mobility on Reliable Transport Protocols", Proc. of the $14^{th}$ ICDCS, Jun. 1994, pp. 1-9.

Cáceres, Ramón et al., "Improving the Performance of Reliable Transport Protocols in Mobile Computing Environments", IEEE, Journal on Selected Areas in Communication 13(5), Jun. 1995, 1-17.

Cho, Kenjiro et al., "A Group Communication Approach for Mobile Computing", IEEE, 1995, pp. 95-102.

Club Key Channels Mobile Office Messenger, "Narrowband Sockets", URL=http://www.club.nokia.com/nbs/N_b-s.html, download date Dec. 15, 1997.

Deri, Luca, "Surfin' Network Resources across the Web", *IEEE*, 1996, pp. 158-167.

DeSimone, Antonio et al., "Throughput Performance of Transport Layer Protocols over Wireless LANs", IEEE, 1993, pp. 542-549.

Dr. Watson (DWTNDA), URL=http://www.cavebear.com/archive/dwtnda/spd.html, download date Jun. 14, 2007.

Duchamp, Dan et al., "Measured Performance of a Wireless LAN", Computer Science Department, Columbia University, New York, New York, pp. 1-6.

Huston, L.B. et al., "Disconnected Operation for AFS", CITI Technical Report 93-3, Jun. 18, 1993, pp. 1-9.

ifsm651, URL=http://userpages.umbc.edu/~palmar/, Dec. 16, 1997, pp. 1-14.

Imielinski, Thomaz et al., "Mobile Wireless Computing: Challenges in DataManagement", Department of Computer Science, Rutgers University, New Brunswick, New Jersey, pp. 1-17.

Ioannidis, John et al., "The Design and Implementation of a Mobile Internetworking Architecture",USENIX Winter Proceedings, Jan. 25-29, 1993, San Diego, California, pp. 489-500.

Ioannidis, John et al., "IP-based Protocols for Mobile Internetworking", accepted for publication at SIGCOMM '91, Conference: Communications Architectures and Protocols, Association for Computing Machinery, Sep. 1991, pp. 235-245.

Jacobson, Van et al., "Congestion Avoidance and Control", Lawrence Berkeley Laboratory, Nov. 1988, pp. 1-21.

Jander, Mary, "Welcome to the Revolution", Data Communications, 25(16), Nov. 21, 1996, pp. 39-53.

Jones, Gordon B., "Managing the Message: Message Tracking", IEEE, Apr. 1998, pp. 743-747.

Keeton, Kimberly et al., "Providing Connection-Oriented Network Services to Mobile Hosts", Proc. of the USENIX Symp. on Mobile and Location-Independent Computing, Cambridge, Massachusetts, Aug. 1993, pp. 1-20.

Kleinrock, Leonard et al., "Static Flow Control in Store-and-Forward Computer Networks", IEEE, 1980, pp. 271-279.

Le, My T. et al., "Software Architecture of Infopad System",Proc. of the Mobidata Workshop on Mobile and Wireless Information Systems, Rutgers, New Jersey, Nov. 1994, pp. 1-11.

Marsh, Brian et al., "Power Measurements of Typical Notebook Computers", Technical Report TR-110-94, Matsushita Information Technology Library, Princeton, New Jersey, May 22, 1994, pp. 1-13.

Mobile IPv6 Agenda, Jun. 26, 1996, URL=http://www3.ietf.org/ietf/ipngwg/ipngwgminutes-96jun.txt, download date Jun. 25, 2007.

Myles, Andrew et al., "A Mobile Host Protocol Supporting Route Optimization and Authentication", IEEE Journal on Selected Areas in Communications 13(5): 839-849, Jun. 1995, pp. 1-21.

Palmer, Roger C., *The Bar Code Book: Reading, Printing and Specification of Bar Code Symbols*, Helmers Publishing, Inc., Peterborough, New Hampshire, 1989, p. 107.

Partridge, Craig et al., "A Faster UDP", IEEE/ACM Trans. on Networking, Aug. 1993, 1-20.

Partridge, Craig et al., "Version 2 of the Reliable Data Protocol (RDP)", Networking Group: Request for Comments: 1151 (updates RFC 908), Apr. 1990, URL=http://community.roxen.com/developers/idocs/rfc/rfc1151.html, download date Jun. 14, 2007.

Perkins, Charlie, "Mobile Networking within IETF",1996, URL=http://athos.rutgers.edu/~sudame/ACM/tut4.html, download date Dec. 29, 1997.

Perkins, Charles et al., "IMHP: A mobile host protocol for the Internet", Computer Networks and ISDN Systems, 27(3), 1994, pp. 479-491.

Perkins, Charles, "MobiCom '95 Tutorial", Aug. 1995, URL=http://www.sigcomm.org/mobicom95/biodata/perkins.html, download date Jun. 14, 2007.

Perkins, Charlie "MobiCom '95 Tutorial: Mobile IP", Aug. 1995, URL=http://www.sigcomm.org/mobicom95/tutorials/perkins_tut.html, download date Jun. 14, 2007.

Perkins, Charles, "Mobile IP", May 1997, Journal IEEE Communications Magazine, 35(5), pp. 1-15.

Perkins, Charles E. et al., "Mobility Support in IPv6", Proc. of the $2^{nd}$ Annual Int'l Conf. on Mobile Computing and Networking (MobiCon '96), Nov. 10-13, 1996, Rye, New York, pp. 1-14.

Perkins, Charles, "Providing continuous network access to mobile hosts using TCP/IP",Computer Networks and ISDN Systems 26, 1993, pp. 357-369.

Postel, J., "User Datagram Protocol", Request for Comment, vol. RFC, No. 768, Aug. 28, 1980, pp. 1-3.

Preston, David J. "Internet Protocols Migrate to Silicon for Networking Devices", Electronic Design, 45(8), Apr. 14, 1997, pp. 87-94.

Rysavy, Peter, "PCCA Standards Committee Passes Annex L", URL=http://www.pcca.org/white/annexl.html, download date Aug. 9, 2007.

Seybold, Andrew M., "Handheld Mobility: Taking it to the Desktop!", URL=http://web.archive.org/web/19990220143859/http://www.pcca.org/articles/mobility.html, download date Jun. 19, 2007.

Shay, William A, "Understanding Data Communications and Networks", PWS Publishing Comp. 1995, pp. 31-37, 249-257.

Skopp, Peter D. et al., "Disconnected Operation in a Multi-User Software Development Environment", IEEE Workshop on Advances in Parallel and Distributed Systems, Oct. 1993, 146-151.

Sollins, K., "The TFTP Protocol (Revision 2)", Network Working Group, Request for Comments: 1350, Jul. 1992, URL=http://snmp.cs.utwente.nl/ietf/rfcs/complete/rfc1350.txt, downloaded Jun. 25, 2007.

Stevens, Richard W., TCP/IP Illustrated, vol. 1, "The Protocols", Addison-Wesley, Professional Computer Series, 1994, pp. 1-51, 143-168, 223-337.

Suslio, Gatot et al., "Infrastructure for Advanced Network Management based on Mobile Code",IEEE, 1998, pp. 322-333.

Teraoka, Fumio et al., "VIP: A Protocol Providing Host Mobility", Aug. 1, 1994, Communications of the ACM 37(8):67-45, 113, Aug. 1994, pp. 1-16.

Toh, Chai-Keong, "The Design of a Hybrid Handover Protocol for Multi-Media Wireless LANs", University of Cambridge Computer Laboratory, pp. 1-6.

Tso, Mike, "Enabling AOAC Mobile Computing with Narrowband Sockets",*Mobile Communication Operation, Intel Corporation*, 1996, 1-14.

Watson, Terri et al., "Local Area Mobile Computing on Stock Hardware and Mostly Stock Software",*Proc. of the USENIX Mobile and Location-Independent Computing Symp.*, Cambridge, Massachusetts, Aug. 2-3, 1993, pp. 109-115.

What's New?, URL=http://www2.staff.fh-vorarlberg.ac.at/~kw.javascript/INetSDK/Help/inet0001.htm, download date Jul. 18, 2003.

Yavatkar, Raj et al., "Improving End-to-End Performance of TCP over Mobile Internetworks", *IEEE*, 1995, pp. 146-152.

* cited by examiner

METHOD, APPARATUS AND ARTICLE TO LOAD NEW INSTRUCTIONS ON PROCESSOR BASED DEVICES, FOR EXAMPLE, AUTOMATIC DATA COLLECTION DEVICES

BACKGROUND OF THE INVENTION

1. Field of the Invention

This disclosure generally relates to the field of processor based devices, for example automatic data collection (ADC) devices such as machine-readable symbol readers and/or radio frequency identification (RFID) readers, and more particularly to loading new instructions on processor based devices.

2. Description of the Related Art

A large variety of processor based devices are currently employed in various fields. For example, the ADC industry markets numerous types of machine-readable symbol readers and radio frequency identification (RFID) readers. Machine-readable symbol readers may include scanners or imagers operable to optically read machine-readable symbols, for example barcode symbols, area or matrix code symbols and/or stack code symbols. RFID readers are operable to wirelessly read information from and/or write information to RFID tags. These ADC devices typically employ one or more processors, for example, one or more microprocessors and/or digital signal processors (DSPs) for executing instructions stored in one or more memories. The memories may include one or more volatile memories, for example dynamic or static random access memory (RAM), and/or one or more nonvolatile memories, for example read only memory (ROM), flash memory, and/or electronically erasable programmable read only memory (EEPROM).

There is often a need or desire to change or replace a set of existing instructions with a set of new instructions. For example, a user or device owner may wish to replace a set of existing instructions with an upgraded set of instructions. Also for example, a device manufacturer or distributor may wish to fix a problem of "bug" in a set of existing instructions by loading a set of new instructions on the processor based device.

The replacement of a set of existing instructions with replacement sets of with instructions is hindered by a number of factors. For example, the large variety of available processor based devices. Even devices from a single manufacturer may have different versions of software installed, as well as different hardware configurations. For example, two barcode scanners of the same general type (e.g., make and model) may each have different types and/or amounts of memory installed. Two RFID readers of different general types may likewise have different processors and/or memories installed.

Further, there is a general desire to reduce the cost of manufacturing and maintaining processor based devices. Manufacturing costs may be reduced by selection of lower cost memories, and/or limiting the amount of installed memory. These restrictions on memory may adversely influence the cost of maintaining processor based devices, for example limiting the ability to replace sets of existing instructions with sets of new instructions. This is particularly problematic where an operating system of the processor based device is to be replaced since the processor based device is executing an existing operating system. Replacement of an operating system typically requires the performance of multiple manual steps. Such typically requires the physical presence of the device at the location of the new operating system and programming hardware. Such also typically requires the time and effort of a trained individual. Further, the number of manual operations required increases the likelihood of problems occurring. For example, a technician would manually install a secure digital (SD) memory card such as those commercially available from Matsushita Electronics of Japan, or some similar media, and an manually launch a reboot of the processor based device.

New methods, apparatus and articles that facilitate the loading of sets of new instructions on processor based devices is thus desirable.

BRIEF SUMMARY OF THE INVENTION

In some aspects, a method, apparatus and/or article may replace a set of existing instructions with a set of new instructions with none or a reduced number of manual operations. In some aspects, a method, apparatus and/or article may employ an existing operating to load a new operating system, in a fashion that is transparent to an end use, for example, avoiding a cold boot of the processor based device. In yet a further aspect, a method, apparatus and/or article may provide the set of new instructions based on an operational characteristic of the processor based device, for example providing the set of new instructions in fragments sized to fit into the blocks of a nonvolatile programmable memory of the processor based device. Thus, sets of new instructions may be remotely loaded to the processor device, with no or a reduced number of manual operations, while the processor based device appears to the end user operate without interruption (i.e., without rebooting).

In one embodiment, a method of loading new instructions on target devices comprises: receiving a new instruction loading executable at a target device; executing the new instruction loading executable on the target device; receiving at least a portion of a set of new instructions at the target device; disabling an interrupt function at the target device; erasing a first block of a nonvolatile programmable memory of the target device; and loading at least a first portion of the set of new instructions to the erased first block of the nonvolatile programmable memory on the target device.

In another embodiment, a method of loading new instructions on target devices comprises: providing a new instruction loading executable to a target device; and providing a set of new instructions at the target device in at least two fragments, the fragments having an uncompressed size selected to fit into a respective block of a nonvolatile programmable memory of the target device.

In yet another embodiment, a computing device, comprises: a volatile memory capable of storing instructions; a nonvolatile programmable memory comprising a plurality of blocks of capable of storing instructions; a processor operable to execute instructions stored in at least one of the volatile memory and the nonvolatile programmable memory, wherein the nonvolatile memory stores a new instruction loading executable that causes the processor to load a set of new instructions on the computing device, by: disabling an interrupt function of the processor; erasing a number of the blocks of the nonvolatile programmable memory of the computing device; and loading portions of the set of new instructions to respective ones of the erased blocks of the nonvolatile programmable memory on the computing device.

In still another embodiment, a system for loading new instructions on target devices, comprises: at least one memory storing at least one new instruction loading executable and at least one set of new instructions for loading onto target devices; at least one communications port coupleable to provide communications with target devices; and a processor operable to provide the set of new instructions to in at least two fragments, the fragments having an uncompressed size selected to fit into a respective block of a nonvolatile programmable memory of an identified target device.

In a further embodiment, a computer-readable medium stores instructions for causing a processor of a computing device to facilitate loading new instructions on the computing device, by: disabling an interrupt function of the processor of the computing device; erasing a number of the blocks of a flash memory of the computing device; and loading portions of a set of new instructions to respective ones of the erased blocks of the flash memory on the computing device.

In yet a further embodiment, a computer-readable medium stores instructions for causing a computer to facilitate loading new instructions on target devices, by: providing a new instruction loading executable to a target device; and providing a set of new instructions at the target device in at least two fragments, the fragments having an uncompressed size selected to fit into a respective block of a flash memory of the target device.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with processor based devices including processors such as microprocessors, digital signal processors (DSPS) or the like, volatile memories such as RAM, nonvolatile memories such as ROMs, flash memories, electronically erasable programmable read only memories (EEPROMs), programmable read, only memories (PROMs) or the like, and/or networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

The headings provided herein are for convenience only and do not interpret the scope or meaning of the embodiments.

Figure 1:
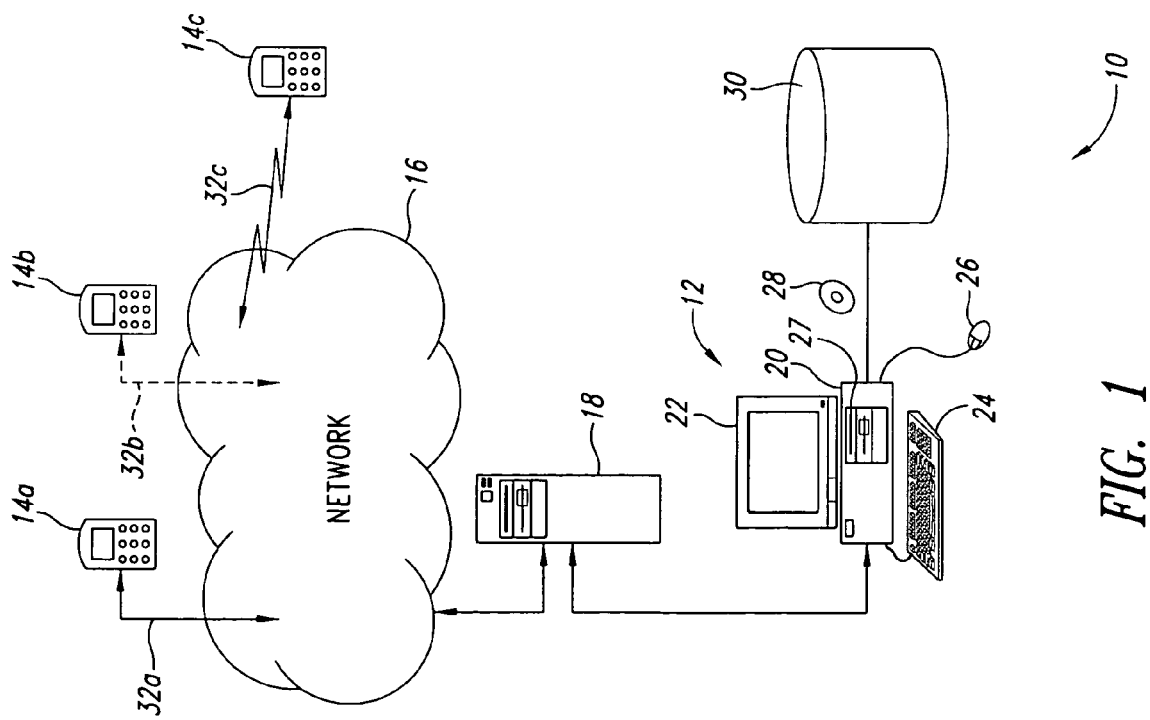
FIG. 1 is a schematic diagram of a host computing system facilitating the loading of new instructions on a variety of processor based devices over a network, according to one illustrated embodiment.

FIG. 1 shows an instruction loading system 10 including a host computing system 12 operable to facilitate the loading of new instructions on processor based devices 14a-14c, according to one illustrated embodiment. The host computing system 12 may communicate with the processor based devices 14a-14c via one or more networks 16, and optionally, via one or more servers 18.

The host computing system 12 may take a variety of forms. For example, the host computing system 12 may take the form of one or more microcomputers or personal computers (PCs), minicomputers or workstations, and/or mainframe computers. The host computing system 12 typically includes a computer 20 including one or more processors, volatile memories, nonvolatile memories, and/or buses. The volatile memories may, for example, include dynamic and/or static random access memory (RAM). The nonvolatile memories may, for example, include read only memory (ROM), flash memory, EEPROM. The buses may, for example, include control, data and/or power buses.

Optionally, the host computing system 12 may also include user input/output (I/O) devices, for example a display 22, keyboard 24 and mouse 26. The I/O devices allow a user or operator to interact with the host computing system 12.

The host computing system 12 may also include processor- or computer-readable medium in addition to the volatile and/or nonvolatile memory. For example, the host computing system 12 may include a drive 27 for reading removable mediums 28, such as floppy disks, optical disks, CD-ROMs, Winchester disks and/or PCMCIA card or the like. Additionally, or alternatively, the host computing system 12 may include drives for reading fixed media 30, such as an internal and/or external hard drive. The processor- or computer-readable medium may store data and instructions executable by the processor.

The processor based devices 14a-14c may take a variety of forms, for example, ADC devices, telecommunications devices, or general computing devices. ADC devices may, for example, take the form of machine readable symbol readers such as bar code imagers or bar code scanners, or may take the form of RFID readers. Telecommunications devices may take the form of cellular phones and/or wireless personal digital assistants (PDAs) such as those sold by Research In Motion of Ontario, Canada under the trademark BLACKBERRY. General computing devices may take a variety of forms including palmtop or laptop computing devices, PDAs, game consoles, point-of-sale (POS) terminals, or even desktop or larger general or special purpose computers.

The network 16 may take a variety of forms, for example, an intranet, extranet or the Internet. The network 16, for example, may take the form of local area networks (LANs) and/or wide area network (WANs). The networks may be wired, wireless, or a combination of wired and wireless. For example, a first processor based device 14a is shown communicating via a wired network connection illustrated by solid double-headed arrow 32a. The wired network connection 32a may take the form of a serial or parallel signal path. A second processor based device 14b is shown communicating via a wireless optical network connection illustrated by broken line double-headed arrow 32b. Such wireless optical network connection may employ line-of-sight communications, for example, via infrared signals. A third processor based device 14c is shown communicating via a wireless radio network connection illustrated double-headed zigzag arrow 32c. Such wireless radio network connection may employ non-line-of-sight communications, for example radio frequency (RF) or microwave signals.

The network 16 may be composed of one or more sub-networks, and may include one or more servers 18. The servers 18 may in some embodiments be considered part of the instruction loading system 10, while in other embodiments the servers 18 are considered distinct from the instruction loading system 10. In even further embodiments, the host computing system 12 may implement one of the servers 18 by executing commercially available server software.

Figure 2:
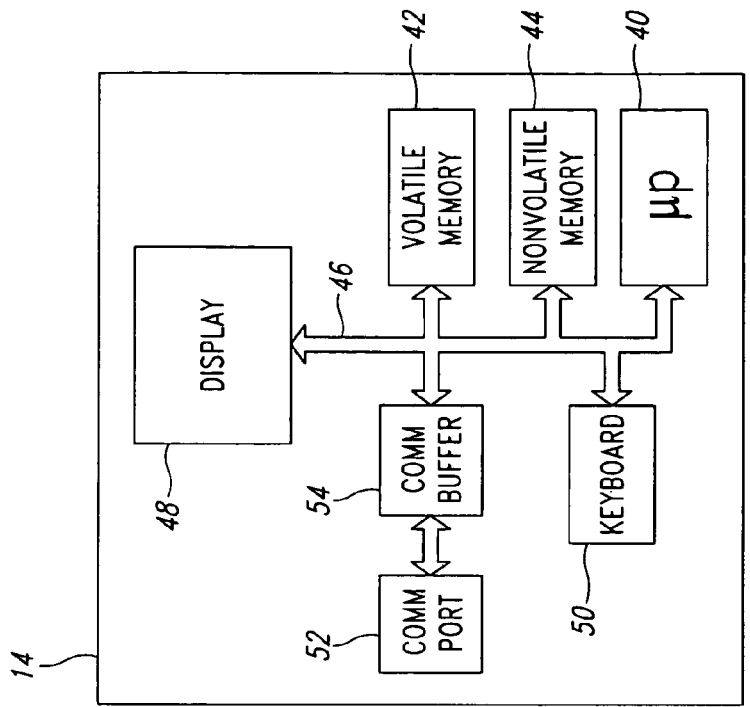
FIG. 2 is a functional block diagram of a processor based device, according to one illustrated embodiment.

FIG. 2 shows an exemplary processor based device 14 according to one illustrated embodiment.

The processor based device 14 includes one or more processors 40, volatile memories 42, nonvolatile programmable memories 44, and buses 46. The processors 40 may, for example, take the form of a microprocessor and/or DSP. The volatile memories 42 may, for example, take the form of dynamic and/or static RAM. The nonvolatile programmable memories 44 may, for example, take the form of EEPROM and/or flash memory (e.g., Intel StrataFlash memory) and/or PROM. Particular embodiments discussed herein employ a nonvolatile programmable memory 44 which can be written to such as flash memory, although EEPROM and/or PROM may be suitable in some embodiments. The memory is typically logically portioned into segments of equal sized "blocks" of contiguous memory. Flash memory may be preferred in some embodiments on the basis of cost, but typically requires the erasing of an entire block before data can be written to a portion of the block. The buses 46 may include separate data buses, control buses, instruction buses and/or power buses.

The processor based device 14 may also include a user input/output (I/O) system which may in some embodiments include a display 48 and keyboard or keypad 50. The I/O system may also include a communication port 52 and an optional communication buffer 54. The communication port 52 can take a variety of forms suitable for, or capable of, providing wired and/or wireless communications connections via the network 16 (FIG. 1). The optional communications buffer 54 may buffer data, information and/or instructions until the processor 40 is ready.

Figure 3:
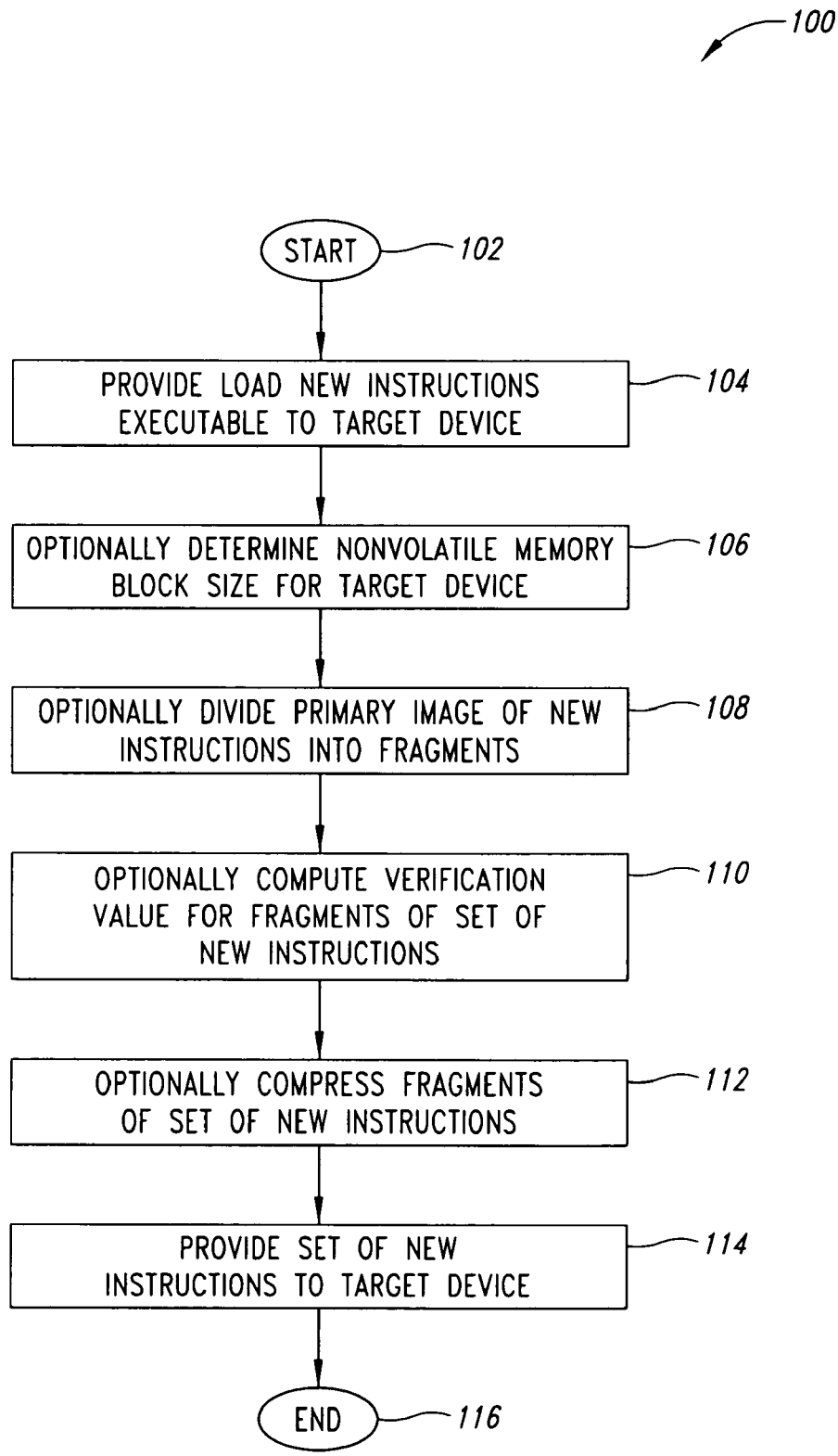
FIG. 3 is flow diagram of a method of operating a host computing system to facilitate the loading of new instructions on a variety of processor based devices, according to one illustrated embodiment.

FIG. 3 shows a method 100 of operating the host computing system 12 to facilitate the loading of new instructions on processor based devices 14a-14c (FIG. 1) according to one illustrated embodiment, starting at 102.

At 104, the host computing system 12 provides a load new instructions executable to a target one of the processor based devices 14a-14c (FIG. 1) via the network 16. The load new instructions executable provides executable instructions to the processor 40 to cause a set of new instructions to replace a set of existing instructions on the processor based device 14.

Optionally at 106, the host computing system 12 determines the block size of the nonvolatile programmable memory 44 of the target processor based device 14. Optionally at 108, the host computing system 12 divides a primary image of a set of new instructions into fragments based on the determined block size. Dividing the set of new instructions into fragments may reduce the memory requirements on the target processor based device 14. Dividing the set of new instructions into fragments may additionally, or alternatively make communications with the target processor based device 14 more efficient.

Optionally at 110, the host computing system 12 computes verification values, for example check sums, for each of the fragments of the set of new instructions. As discussed in more detail below with reference to FIG. 7, verification values such as check sums may advantageously allow the verification of the set of new instructions before replacing an existing set of instructions.

Optionally at 112, the host computing system 12 compresses the fragments of the set of new instructions. Compression may make communications with the target processor based device 14 more efficient. Compression may additionally, or alternatively reduce the memory requirements on the target processor based device 14.

At 114, the host computing system 12 provides the set of new instructions to the target processor device 14, with the method 100 terminating at 116. Where the set of new instructions were divided, the host computing system 12 may provide the set of new instructions as individual fragments. Alternatively, the host computing system 12 may provide the set of new instructions as one contiguous file.

Figure 4:
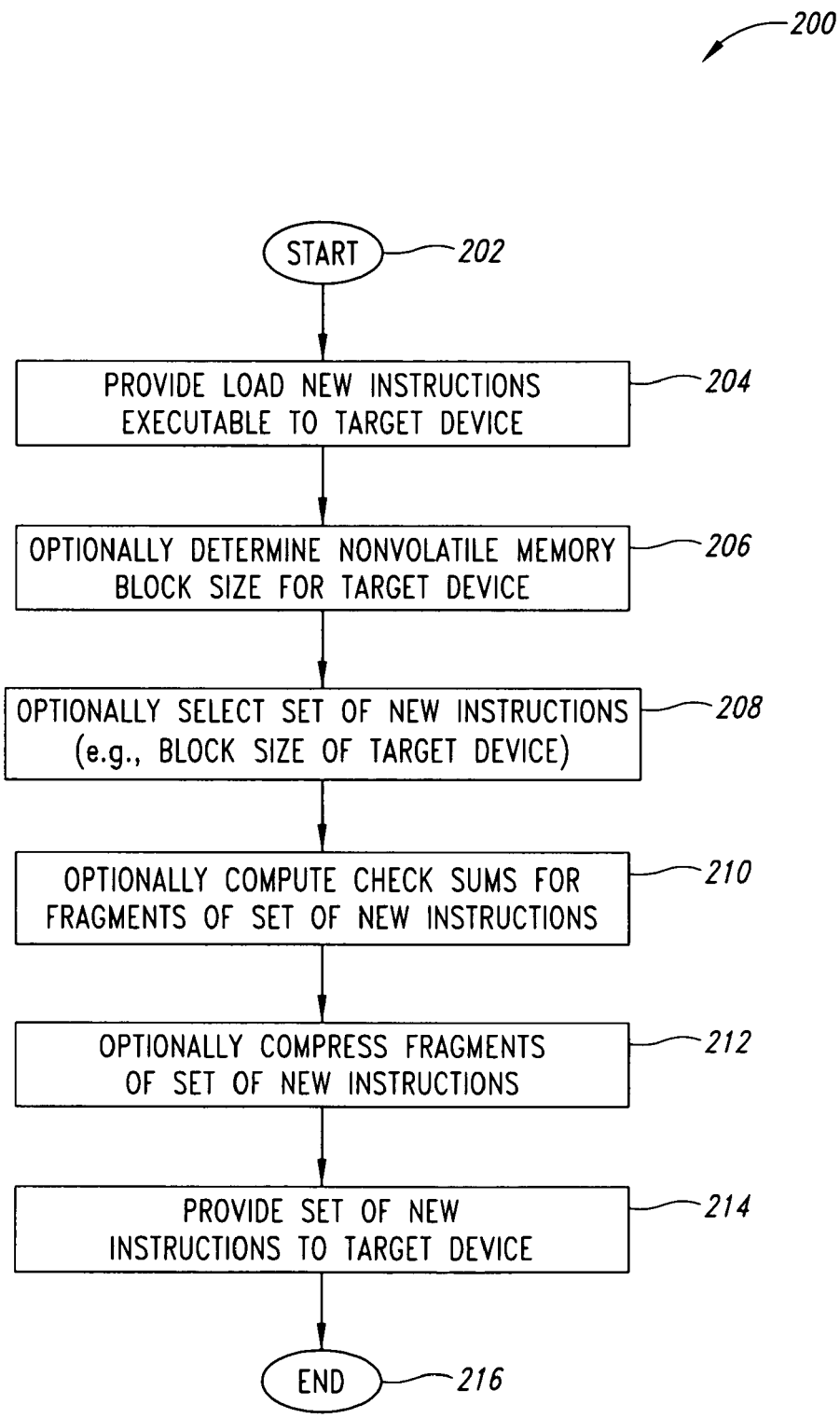
FIG. 4 is flow diagram of a method of operating a host computing system to facilitate the loading of new instructions on a variety of processor based devices, according to another illustrated embodiment.

FIG. 4 shows a method 200 of operating the host computing system 12 to facilitate the loading of a set of new instructions on processor based devices 14a-14c (FIG. 1) according to another illustrated embodiment, starting at 202.

At 204, the host computing system 12 provides a load new instructions executable to a target one of the processor based devices 14a-14c (FIG. 1) via the network 16. As discussed previously, the load new instructions executable provides instructions to the processor 40 to cause a set of new instructions to replace a set of existing instructions on the processor based device 14 (FIG. 2).

Optionally at 206, the host computing system 12 determines a block size for the nonvolatile programmable memory 44 of the target processor based device 14.

Optionally at 208, the host computing system 12 selects a set of new instructions for the target processor based device 14. The set of new instructions may take the form of a new operating system, new application program, new driver or other set of software instructions that differ from a set of existing instructions loaded on the processor based device 14. The set of new instructions may remedy a problem with the set of existing instructions, provide new functionality, or enhance existing functionality.

The selection may be based on some operational characteristic of the target processor based device 14. For example, the selection may be based on the type of processor(s) 40 and/or type and/or amount of memory 42, 44 installed in the target processor based device 14. Additionally, or alternatively, the selection may be based on other hardware or functional aspects of the target processor based device 14. For example, the selection may be based on whether the target processor based device 14 includes a scan engine or an imager, and/or may further be based on the particular type of scan engine or imager. Also for example, the selection may be based on whether the target processor based device 14 includes a radio transmitter, receiver or transceiver, and/or on the particular type of radio transmitter, receiver or transceiver. The operational characteristics may be identified from an alpha, numeric or alphanumeric identifier, for example, make and/or model of the target processor based device 14 or even a unique serial number associated with the target processor based device 14. In one particularly advantageous embodiment, the selection may optionally be based at least in part on the determined block size of the nonvolatile programmable memory 44 of the target processor based device 14. Thus, the selection may be made from various sets of new instructions that have previously been divided into fragments of various size, so as to select a fragmented set of new instructions where the fragments fit into the blocks of the nonvolatile programmable memory 44.

Optionally at 210, the host computing system 12 determines a verification value, such as by computing a check sum for the fragments. Alternatively, these verification values may be previously determined, for example determined and stored before the selection at 208. Some embodiments may also include the addition of error correction for the fragments. Some embodiments may not employ verification values such as check sums, and/or error correction.

Optionally at 212, the host computing system 12 compresses the fragments. Compression may allow more efficient communications by the host computing system 12 with the target processor based device 14. Additionally, or alternatively, compression may allow the use of smaller memories 42, 44 on the target processor based device 14. Alternatively, the fragments may be previously compressed, for example, compressed and stored prior to the selection at 208. Some embodiments may not employ compression.

At 214, the host computing system 12 provides the set of new instructions to the target processor based device 14 via the network 16, the method 200 terminating at 216.

Figure 5A:
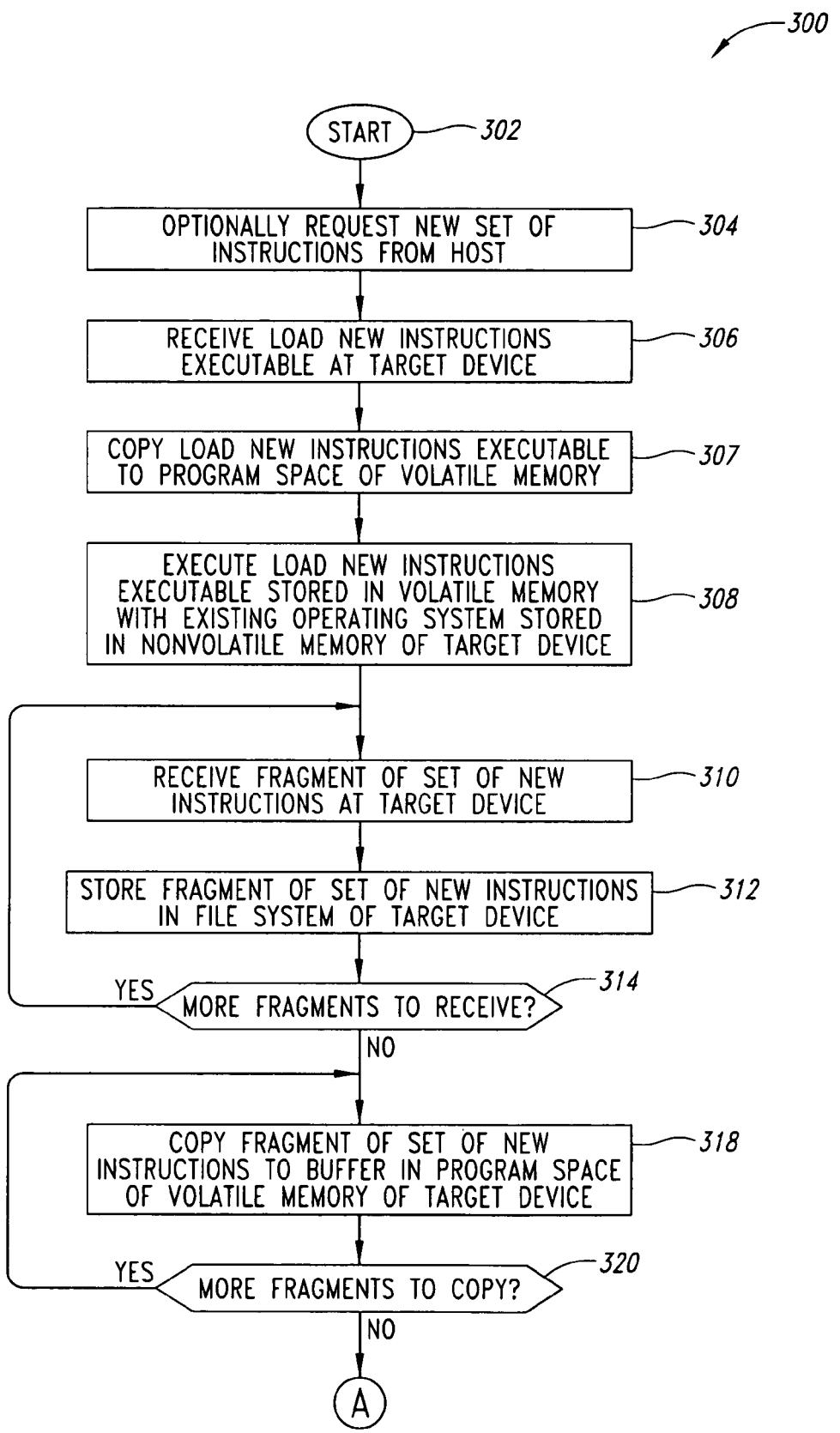
FIGS. 5A and 5B are a flow diagram of a method of operating a processor based device to facilitate the loading of new instructions on the processor based device, according to one illustrated embodiment.
Figure 5B:
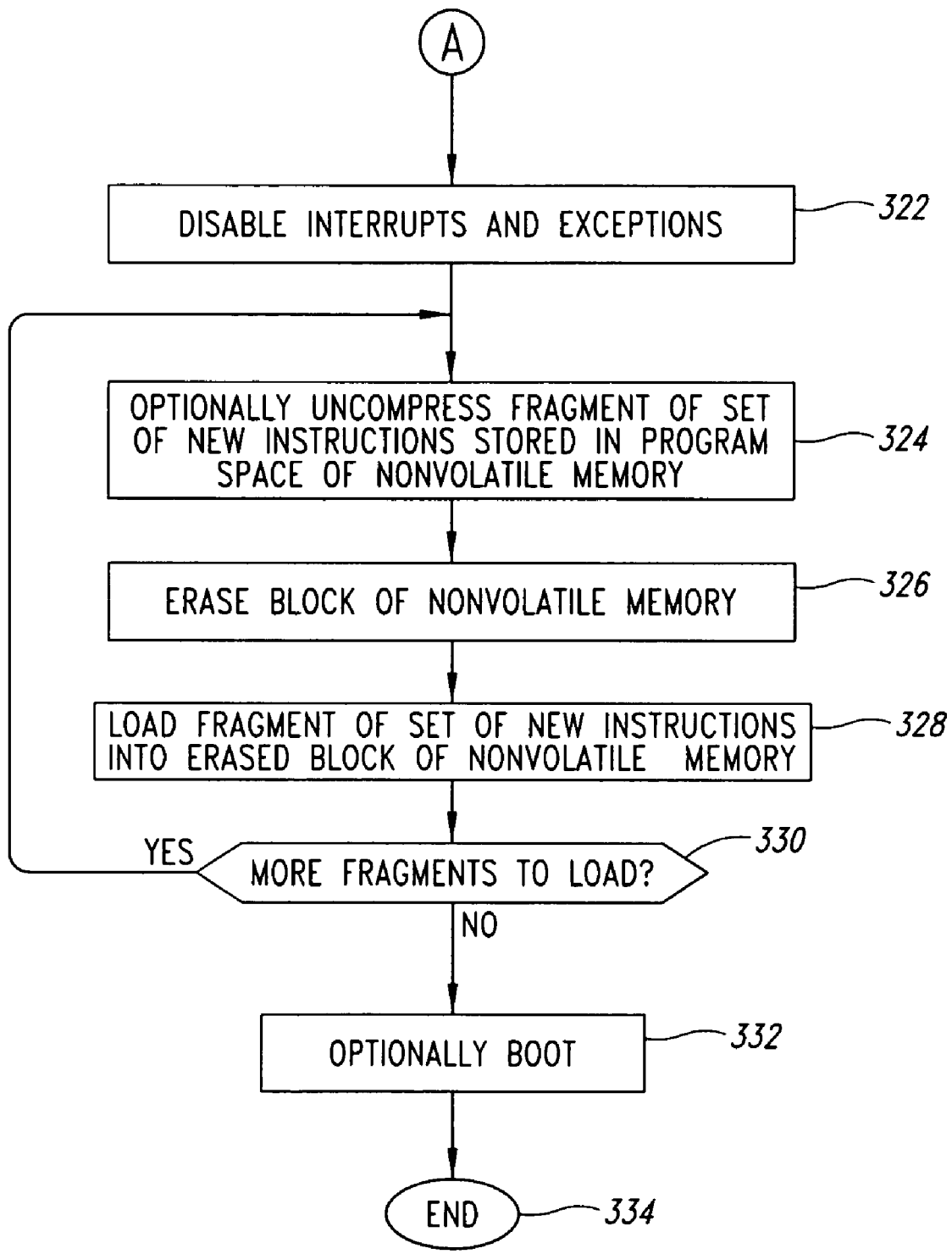

FIGS. 5A and 5B show a method 300 of operating a processor based device 14 to facilitate the loading of new sets of instructions on the processor based device 14, according to one illustrated embodiment starting at 302.

Optionally at 304, the processor based device 14 requests a set of new instructions from the host computing system 12. As noted previously, the set of new instructions may take the form of a new operating system, new application program, new driver or other set of software instructions that differ an existing set of instructions loaded on the processor based device 14. The set of new instructions may remedy a problem with a set of existing instructions, provide new functionality, or enhance existing functionality.

At 306, the processor based device 14 receives the load new instructions executable from the host computing system 12. At 307, the processor based device 14 copies the load new instructions executable to the program space of the volatile memory 42. At 308, the processor based device 14 executes the load new instructions executable stored in its volatile memory 42 while executing an existing operating system stored in its nonvolatile programmable memory 44.

At 310, the processor based device 14 receives a fragment of the set of new instructions. At 312, the processor based device 14 stores the fragment in a file system of the processor based device 14. For example, the file system may be a portion of the volatile memory 42.

At 314, the processor based device 14 determines whether there are more fragments of the set of new instructions to receive. If there are more fragments of the set of new instructions to receive, control passes back to 310. If there are no more fragments of the set of new instructions to receive, control passes to 318.

At 318, the processor based device 14 copies a fragment of the set of new instructions to a buffer in a program space of the volatile memory 42. At 320, the processor based device 14 determines whether there are more fragments of the set of new instructions to copy. If there are more fragments of the set of new instructions to be copied, control passes back to 318. If there are no more fragments of the set of new instructions to be copied, control passes to 322. At 322, the load new instruction executable causes the processor based device 14 to disable interrupts and/or exceptions. Exceptions are disable for ARM processors. Disabling interrupts and/or exceptions allows the processor 40 to execute the load new instructions executable without interference resulting from the existing operating system handling an interrupt or exceptions request. Thus, disabling the interrupts essentially suspends the existing operating system, which may be considered to no longer be executing.

Optionally, if the received fragments are compressed, the processor based device 14 uncompresses fragments stored in the program space of the volatile memory 42 at 324. At 326, the processor based device 14 erases a block of the nonvolatile programmable memory 44. At 328, the processor based device 14 loads a fragment of the set of new instructions into the erased block of nonvolatile programmable memory 44.

At 330, the processor based device 14 determines whether there are more fragments of the set of new instructions to load. If there are more fragments of the set of new instructions to load, control passes back to 324. If there are no more fragments of the set of new instructions to load, control passes to 332 where the load new instructions executable optionally causes a cold boot of the processor based device 14, the method 300 terminating at 334. The cold boot automatically resets or initializes the registers of the processor, and causes the processor 40 to begin executing the set of new instructions which were loaded into the nonvolatile memory 44.

The method 300 may employ other ways of invoking the operating system. For example, the load new instructions executable may jump to a start location of the operating system in the nonvolatile programmable memory 44. While such an approach may have to rely on the load new instructions executable to reset or initialize the registers of the processor 40, such an approach would advantageously provide the end user with a transparent experience. For example, the end user may be able to receive an upgrading of an operating system without going through a boot routine.

Thus, the method 300 may advantageously load a new operating system into nonvolatile programmable memory 44 without copying or otherwise moving an existing operating system into volatile memory 42, and may do so without executing a boot routine.

Figure 6A:
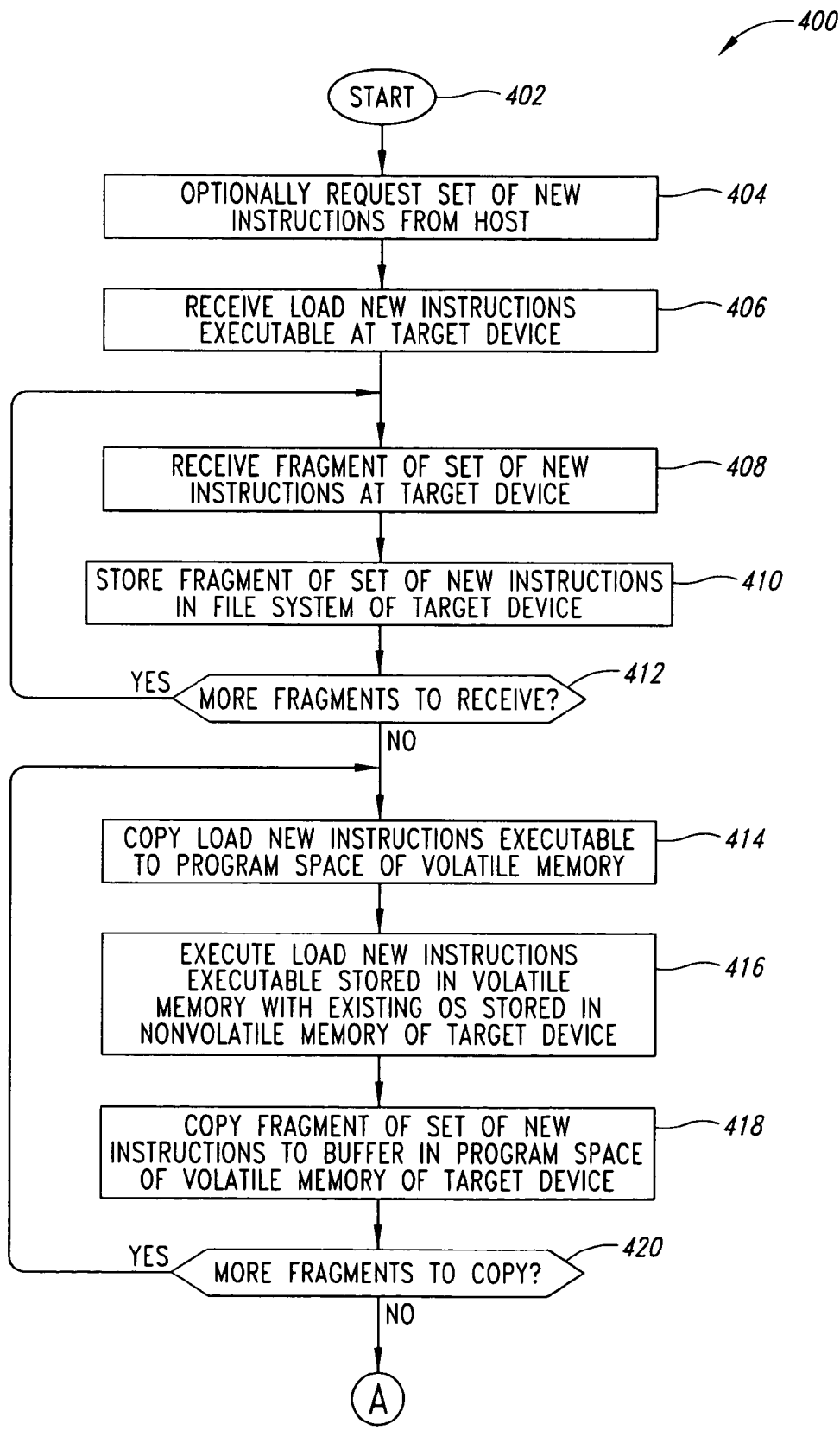
FIGS. 6A and 6B are a flow diagram of a method of operating a processor based device to facilitate the loading of new instructions on the processor based device, according to another illustrated embodiment.
Figure 6B:
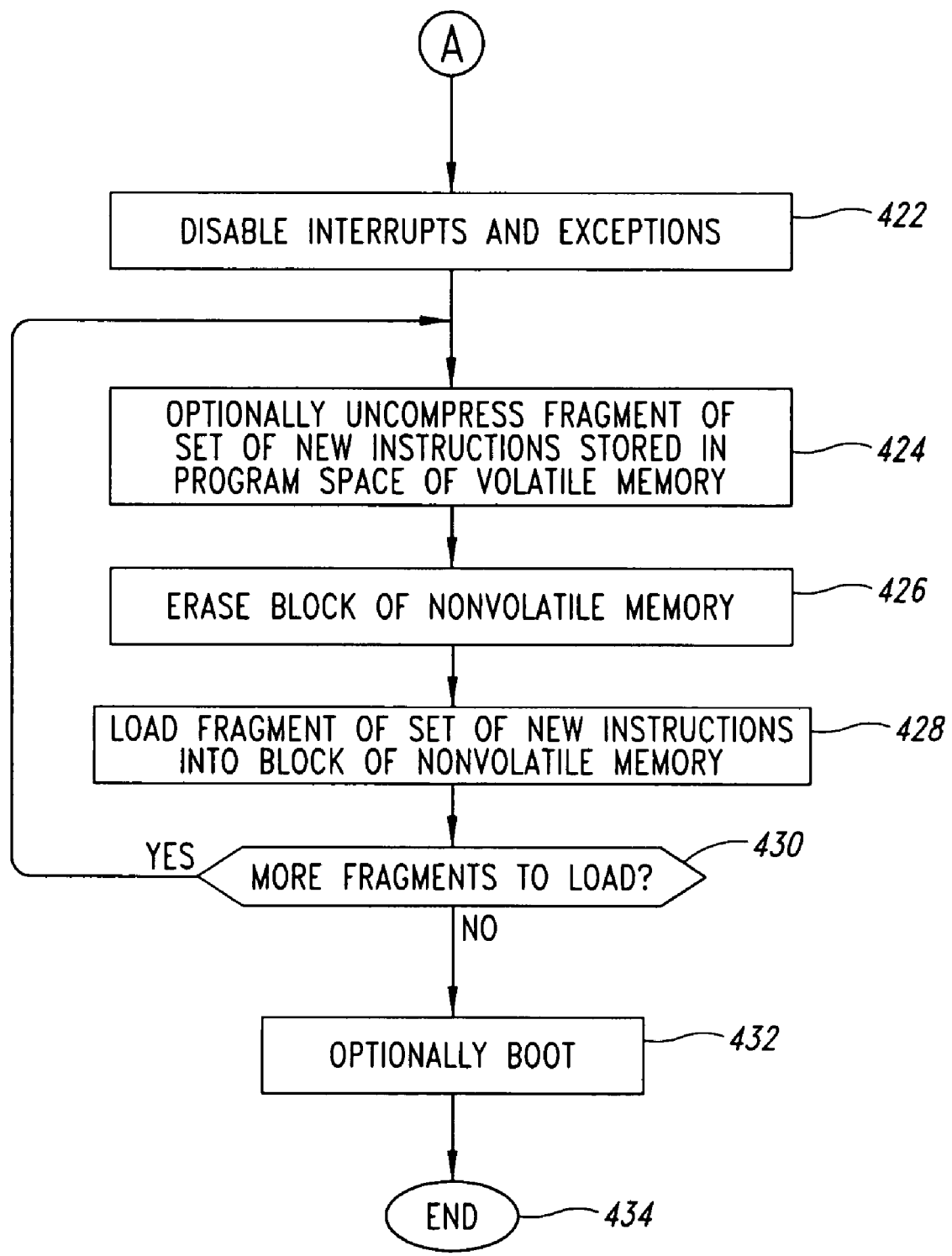

FIGS. 6A and 6B show a method 400 of operating a processor based device 14 to facilitate loading of new sets of instructions on the processor based device 14, according to another illustrated embodiment starting at 402.

Optionally at 404, the processor based device 14 requests a set of new instructions from the host computing system 12. At 406, the processor based device 14 receives a load new instructions executable.

At 408, the processor based device 14 receives fragments of the set of new instructions from the host computing system 12. At 410, the processor based device 14 stores the fragments of the set of new instructions in the file system.

At 412, the processor based device 14 determines whether there are more fragments of the set of new instructions to receive. If there are more fragments of the set of new instructions to receive, control passes back to 408. If there are no more fragments of the set of new instructions to receive, control passes to 414.

At 414, the processor based device 14 copies the load new instructions executable to the program space of the volatile memory 42. At 416, the processor based device 14 executes the load new instructions executable while executing an existing operating system stored in the nonvolatile programmable memory 44.

At 418, the processor based device 14 copies a fragment of the set of new instructions to a buffer in the program space of the volatile memory 42. At 420, the processor based device 14 determines whether there are more fragments of the set of new instructions to copy. If there are more fragments of the set of new instructions to copy, control passes back to 414. If there are no more fragments of the set of new instructions to copy, control passes to 422.

At 422, the load new instructions executable causes the processor based device 14 to disable interrupts and exceptions. As discussed above, disabling interrupts and/or exceptions essentially suspends or terminates operation of the existing operating system, and thus allows the processor 40 to execute the load new instructions executable without interference resulting from the existing operating system handling an interrupt or exceptions request.

Optionally, if the fragments of the set of new instructions are compressed, the processor based device 14 uncompresses the fragments of the set of new instructions stored in the program space of the volatile memory 42 at 424.

At 426, the load new instructions executable causes the processor based device 14 to erase a block of the nonvolatile programmable memory 44. At 428, the load new instructions executable causes the processor based device 14 to load a fragment of the set of new instructions into the erased block of nonvolatile programmable memory 44.

At 430, the processor based device 14 determines whether there are more fragments of the set of new instructions to load. If there are more fragments of set of new instructions to load, control passes back to 424. If there are no more fragments of the set of new instructions to load, control passes to 432.

Optionally, at 432, the load new instructions executable causes the processor based device 14 to perform a cold boot, the method 400 terminating at 434. The cold boot resets of initializes the registers and causes the processor 40 to being executing the set of new instructions which were loaded into the nonvolatile memory 44.

The method 400 may employ other ways of invoking the operating system. For example, the load new instructions executable may jump to a start location of the operating system in the nonvolatile programmable memory 44. While such an approach may have to rely on the load new instructions executable to reset or initialize the registers of the processor 40, such an approach would advantageously provide the end user with a transparent experience. For example, the end user may be able to receive an upgrading of an operating system without going through a boot routine.

Thus, the method 400 may advantageously load a new operating system into nonvolatile programmable memory 44 without copying or otherwise moving an existing operating system into volatile memory 42, and may do so without executing a boot routine.

Figure 7:
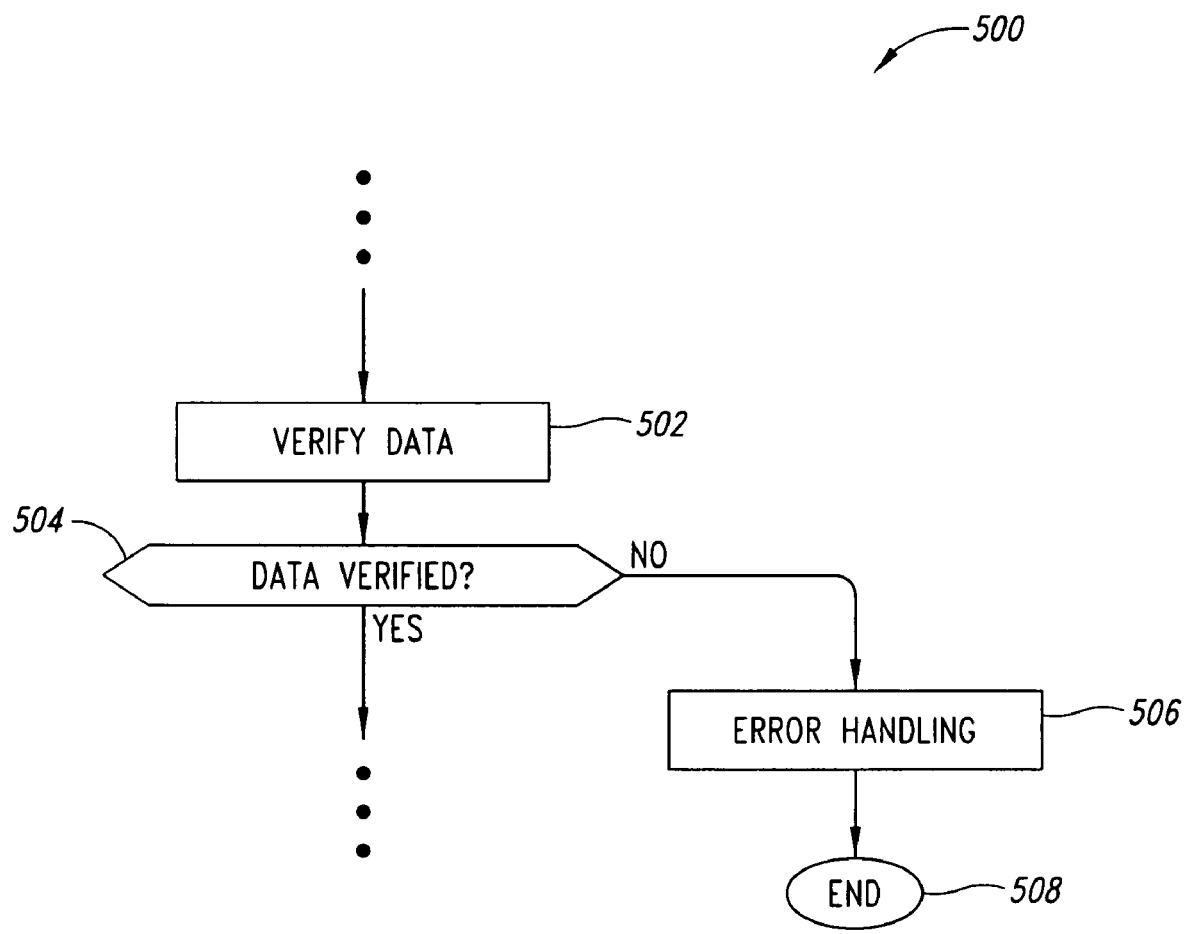
FIG. 7 is flow diagram of a method of verifying data according to one illustrated embodiment, the method useful in the methods operating a processor based device illustrated in FIGS. 5A, 5B and 6A, 6B.

FIG. 7 shows a verification method 500 which may be employed with any of methods 100, 200, 300 and 400. The verification method 500 verifies data after an operation such as receipt, uncompressing, copying or loading. Verification values such as check sums may advantageously allow the verification of the set of new instructions before replacing an existing set of instructions, avoiding potentially replacing a properly functioning existing set of instructions with an inoperable new set of instructions.

The verification method 500, and may be called as a function or subroutine, or may be implemented as an integral portion of the software implementing the methods 100, 200, 300 and/or 400. The verification method 500 may be executed after some or all acts of receiving portions of the new sets of instructions, uncompressing portions of the new sets of instructions, copying portions of the new sets of instructions into program space of volatile memory 42 or loading portions of the new sets of instructions into nonvolatile programmable memory 44. Thus, the verification method is illustrated as being entered from some executing operation (e.g., methods 100, 200, 300, 400), and if successful exits back into the method at the same location from where it left.

At 502, a verification is performed on the data. For example, a processor based device 14 may determine whether the received, uncompressed, copied and/or loaded fragment or portion of the new sets of instructions data matches a check sum value. At 504, the processor determines whether the data is verified. If the data is verified, control passes to the next step in the method 100, 200, 300 and 400. If the data is not verified, control passes to 506, where error handling is performed. Error handling may include providing a message to the processor 40, to the host computing system 12 and/or to a user of either the host computing system 12 or processor based device 14. Error handling may also optionally include rerequesting the data or reperforming the failed act. Error handling may additionally, or alternatively, include employing error correction techniques (e.g., Reed-Solomon, etc.) to correct the received, uncompressed, copied and/or loaded fragment. After error handling, the method 500 optionally terminates at 508.

FIGS. 8-12 show an example of how new sets of instructions represented as a new operating system 60 and new persistent storage manager (PSM, a registered trademark of Intel) software 62 may be loaded on the processor based device 14. The example should not be considered limiting.

Figure 8:
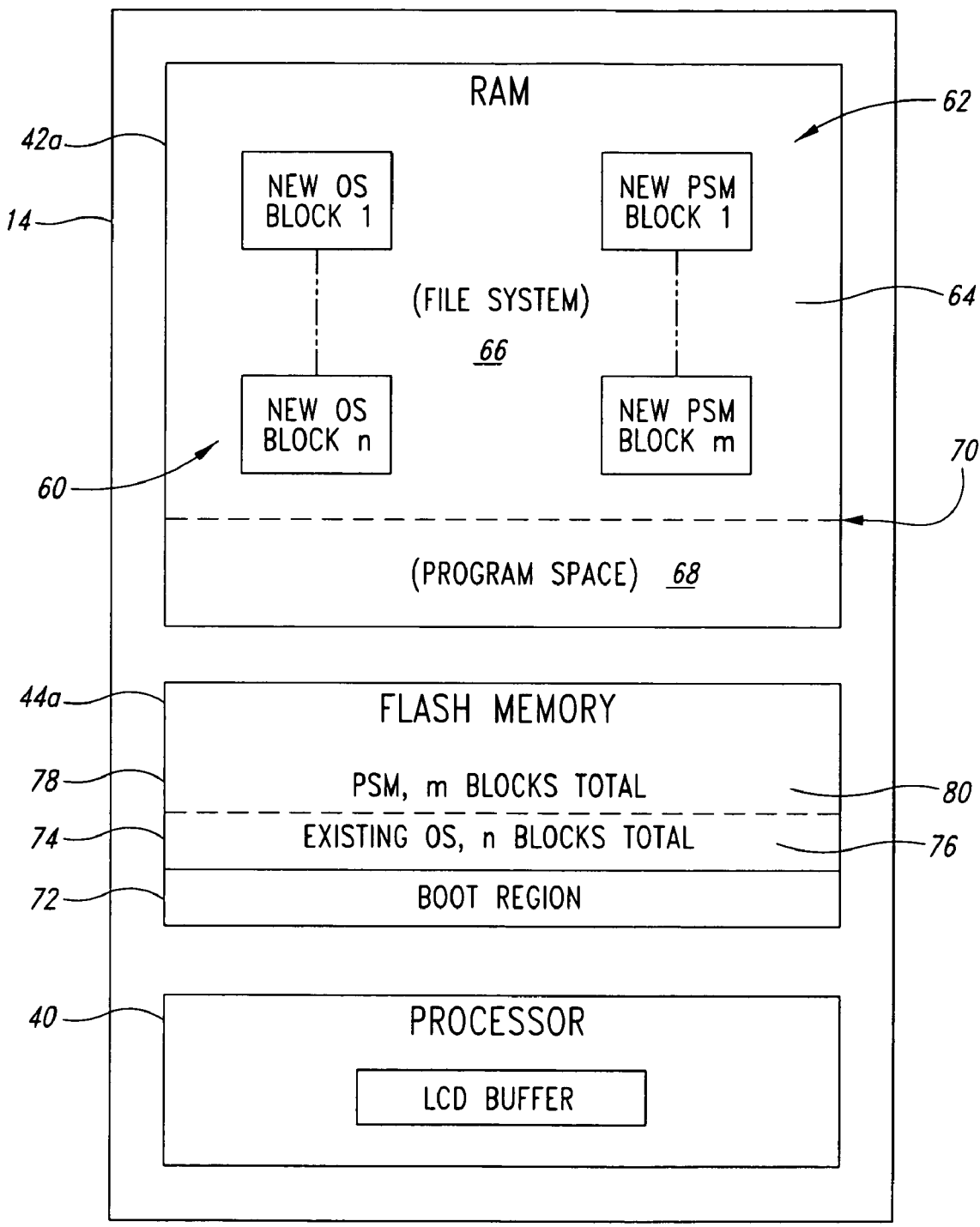
FIG. 8 is a schematic diagram of a processor based device where compressed sets of new instructions are copied into a file system, according to one example.

In particular, FIG. 8 shows the new operating system 60 and the PSM software 62 loaded into a file system 64. The PSM software 62 combines all nonvolatile memory functions into a single chip. Such may enable the combination of executable code, registry back-up, and file storage in a single flash memory. This may facilitate a reduction in power consumption, component count, inventory costs, board costs, and manufacturing costs, while increasing system reliability and valuable user storage. Many systems using the Windows CE (registered trademark of Microsoft of Redmond, Wash.) operating system (OS) need to store both code and data. Traditionally, only executable code was stored in linear flash. Data was stored in battery backed RAM or disk emulation flash products. PSM allows integration of executable code and file storage functions into a single flash chip, and works with the file system of Microsoft Windows CE OS to provide simultaneous access to separate code and file partitions in the same chip. This allows the code can be direct executed, demand paged, or memory mapped. PSM software also implements the pre-OS low-level driver functions needed to reliably back-up and restore OS configuration files via the Microsoft Windows CE OS registry.

In this embodiment, the file system 64 takes the form of a file system space 66 of a volatile memory which takes the form of RAM 42a. The RAM 42a is sectioned into the file system space 66 and a program space 68 by a movable RAM boundary 70.

In this embodiment the nonvolatile memory takes the form of a flash memory 44a. The flash memory 44a is partitioned into a boot region 72 storing boot code, an OS region 74 storing an existing operating system 76 which the processor 40 is currently executing, and another logical region identified for ease of reference in this example as a PSM region 78 storing existing PSM software 80.

Figure 9:
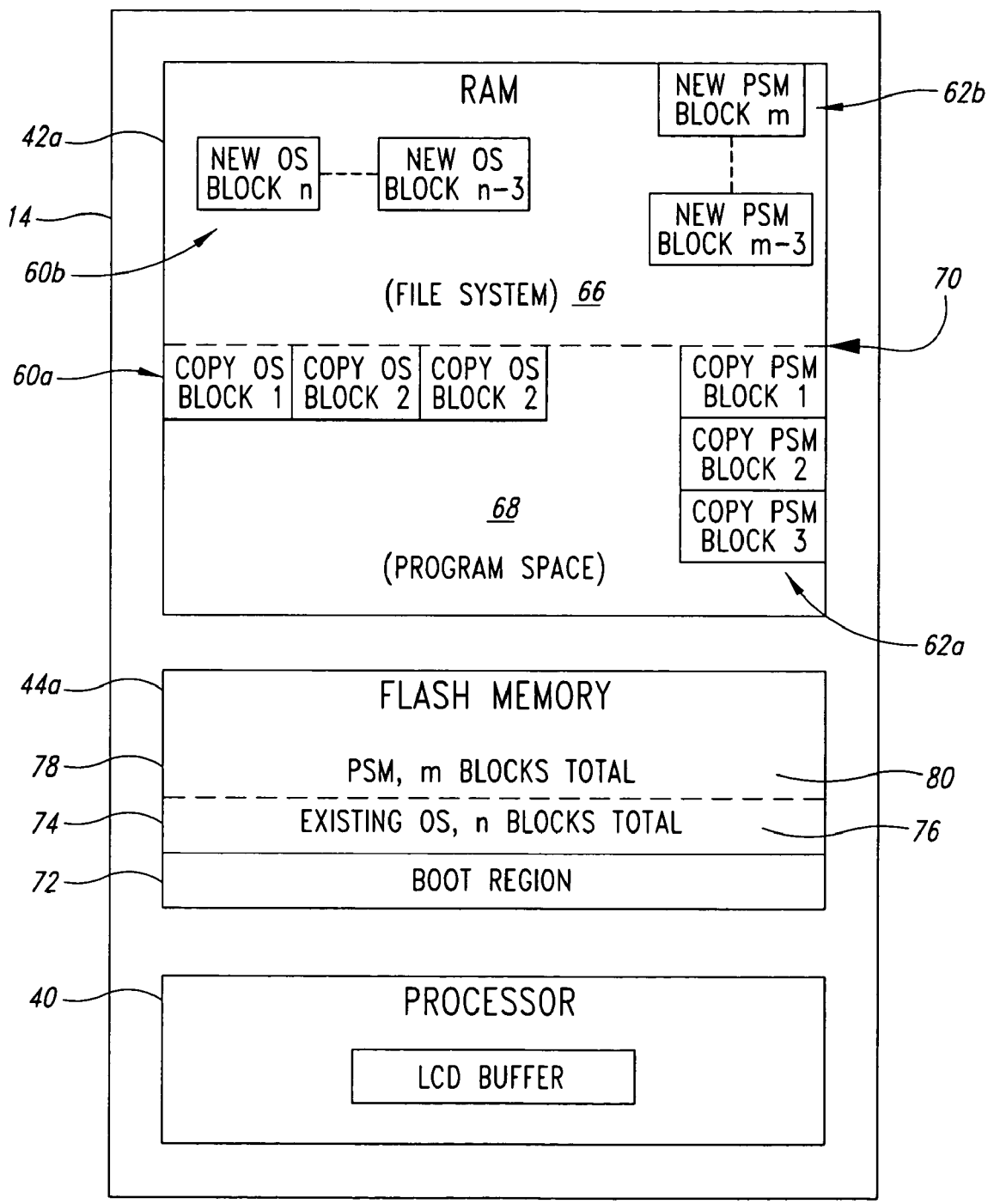
FIG. 9 is a schematic diagram of the processor based device of FIG. 8 where portions of the compressed sets of new instructions are copied into a program space of a volatile memory.

FIG. 9 shows a portion 60a of the new operating system 60 and a portion 62a of new PSM software 62 copied from the file system space 66 into the program space 68 of the RAM 42a, while a portion 60b of the new operating system 60 and a portion 62b of new PSM software 62 remain in the file system space 66.

Figure 10:
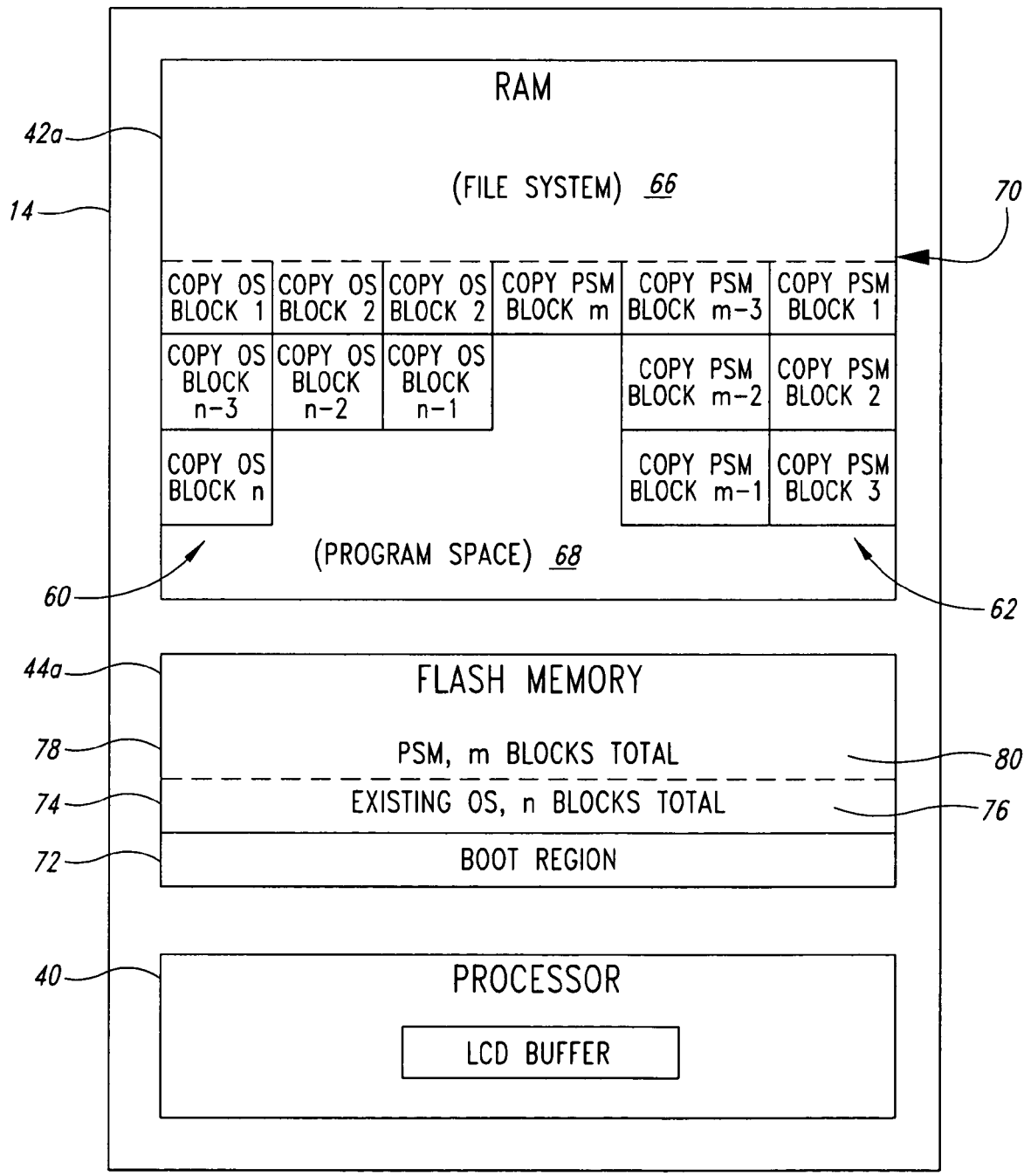
FIG. 10 is a schematic diagram of the processor based device of FIGS. 8 and 9 where all of the compressed sets of new instructions are copied into a program space of a volatile memory.

FIG. 10 shows all of the new operating system 60 and all of the new PSM software 62 copied from the file system 66 into the program space 68 of the RAM 42a.

Figure 11:
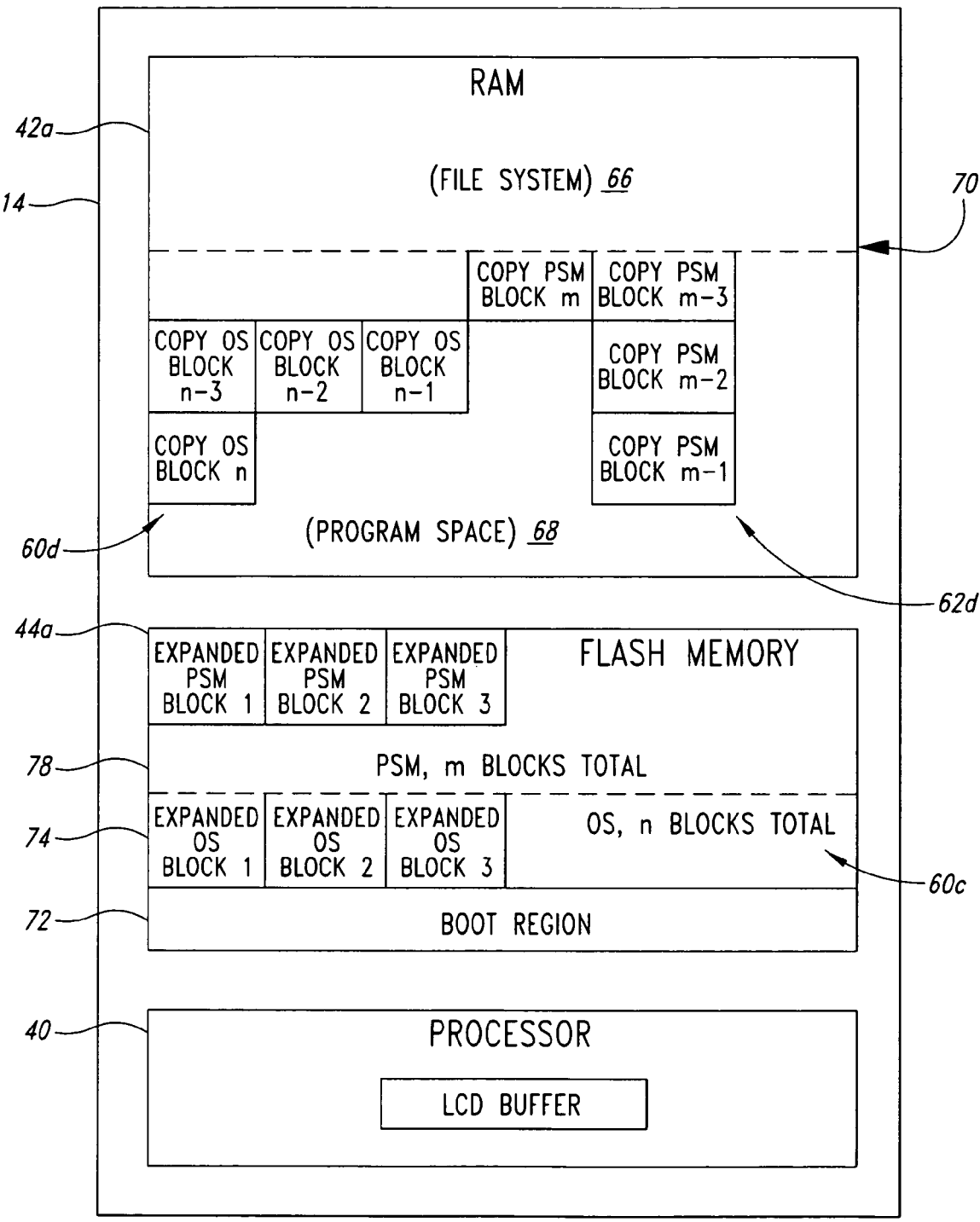
FIG. 11 is a schematic diagram of the processor based device of FIGS. 8-10 where portions of the sets of new instructions are uncompressed and loaded into an OS region and PSM region of a nonvolatile memory.

FIG. 11 shows a portion 60c of new operating system 60 and a portion 62c of the new PSM software 62 uncompressed and loaded from the program space 68 of the RAM 42a into the OS region 74 and PSM region 78 of the flash memory 44a, respectively. A portion 60d of new operating system 60 and a portion 62d of the new PSM software 62 are still in the program space 68 of the RAM 42a, awaiting loading.

Figure 12:
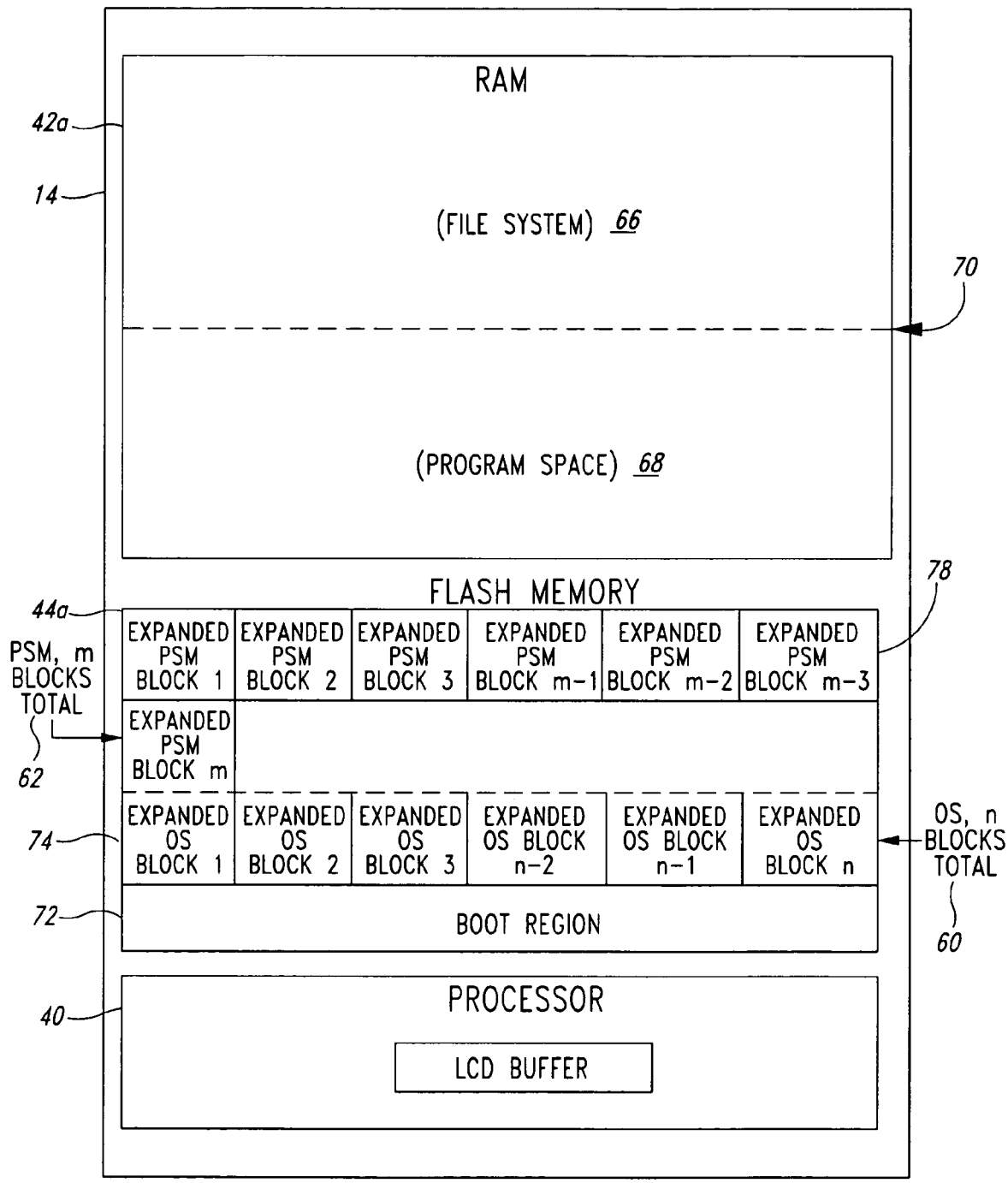
FIG. 12 is a schematic diagram of the processor based device of FIGS. 8-10 where all of the sets of new instructions are uncompressed and loaded into an OS region and PSM region of a nonvolatile memory, and the processor is executing the new operating system.

FIG. 12 shows all of the new operating system 60 and new PSM software 62 loaded and uncompressed from the program space 68 of the RAM 42a into the OS region 74 and PSM region 78 of the flash memory 44a, respectively. At this point the processor 40 is executing the new operating system 60 and the new PSM software 62. Thus, the new operating system 60 is loaded into the nonvolatile memory 44 without copying or otherwise transferring the existing operating system 76 to RAM 42a.

The above description of illustrated embodiments, including what is described in the Abstract, is not intended to be exhaustive or to limit the invention to the precise forms disclosed. Although specific embodiments of and examples are described herein for illustrative purposes, various equivalent modifications can be made without departing from the spirit and scope of the invention, as will be recognized by those skilled in the relevant art. The teachings provided herein of the invention can be applied to other processor based devices, not necessarily the processor based ADC devices generally described above. For instance, the teachings may be implemented in a telecommunications device, for example a cellular, personal digital assistant, or general or special purpose computing system of device.

Also for instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that some of the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including U.S. Pat. No. 6,618,162, issued Sep. 9, 2003; U.S. Pat. No. 6,857,013, issued Feb. 15, 2005; U.S. Patent Publication 2005/0034029, published Feb. 10, 2005; and U.S. patent application Ser. No. 08/852,002, filed May 6, 1997, and now abandoned; are incorporated herein by reference, in their entirety. Aspects of the invention can be modified, if necessary, to employ systems, circuits and concepts of the various patents, applications and publications to provide yet further embodiments of the invention.

These and other changes can be made to the invention in light of the above-detailed description. In general, in the following claims, the terms used should not be construed to limit the invention to the specific embodiments disclosed in the specification and the claims, but should be construed to include all processor based devices, computing systems, methods or articles that accord with the claims. Accordingly, the invention is not limited by the disclosure, but instead its scope is to be determined entirely by the following claims.

We claim:

1. A method of loading new instructions on target devices, the method comprising:
   receiving a new instruction loading executable at a target device during a first period of time;
   executing the new instruction loading executable on a processor of the target device during a second period of time subsequent to the first period of time, and wherein for a time span extending from a start of the first period of time to a start of the second period of time, the processor of the target device is not booted;
   receiving at least a portion of a set of new instructions at the target device;
   disabling an interrupt function at the target device based on executing the new instruction loading executable;
   erasing a first block of a nonvolatile programmable memory of the target device; and
   loading at least a first portion of the set of new instructions to the erased first block of the nonvolatile programmable memory on the target device based on the execution of the new instruction loading executable.

2. The method of claim 1, further comprising
   executing an existing operating system of the target device stored in a nonvolatile programmable memory of the target device on a processor of the target device during the first period of time, and wherein disabling an interrupt function at the target device based on executing the new instruction loading executable includes suspending execution of the existing operating system of the target device based on executing the new instruction loading executable.

3. The method of claim 2 wherein the set of new instructions comprises a new operating system, wherein the first block of the nonvolatile programmable memory of the target device stored a first portion of the existing operating system prior to erasure of the first block of the nonvolatile programmable memory, wherein the first portion of the set of new instructions loaded into the first block of the nonvolatile programmable memory comprises a first portion of the new operating system, further comprising:
   subsequent to loading at least the first portion of the set of new instructions to the erased first block of the nonvolatile programmable memory on the target device, erasing a second block of the nonvolatile programmable memory of the target device having a second portion of the existing operating stored therein; and
   prior to erasing a third block of the nonvolatile memory, loading at least a second portion of the new operating system to the erased second block of the nonvolatile programmable memory on the target device, wherein the nonvolatile memory comprises at least three blocks of equal size.

4. The method of claim 3 wherein receiving at least a portion of a set of new instructions at the target device comprises receiving the set of new instructions in at least two compressed fragments, each of the fragments sized to fit a block size of any block of the nonvolatile programmable memory when uncompressed.

5. The method of claim 4, further comprising:
   uncompressing at least a first one of the fragments before the first portion of the new operating system is loaded into to the erased first block of the nonvolatile programmable memory on the target device.

6. The method of claim 5, further comprising:
   verifying at least the uncompressed first one of the fragments before the first portion of the new operating system is loaded into to the erased first block of the nonvolatile programmable memory on the target device.

7. The method of claim 3, wherein the target device includes a volatile memory and the processor is communicatively coupled to the nonvolatile programmable memory and the volatile memory, wherein receiving at least a portion of a set of new instructions at the target device includes storing the at least portion of the set of new instructions in the volatile memory, and wherein while the existing operating system is executed and while the existing operating system is suspended, the volatile memory on the target device does not store a copy of the existing operating system.

8. The method of claim 7, further comprising:
   executing at least a portion of the new operating system without booting the processor on the target device after a last portion of the set of new instructions has been loaded to a respective block of the nonvolatile programmable memory of the target device.

9. The method of claim 5 wherein receiving at least a portion of a set of new instructions at the target device comprises receiving the set of new instructions in a file system of the target device, the method further comprising:
   copying at least the uncompressed first one of the fragments to a respective area of a volatile memory of the target device before the first portion of the new operating system is loaded into to the erased first block of the nonvolatile programmable memory on the target device.

10. The method of claim 1 wherein receiving at least a portion of a set of new instructions at the target device comprises receiving the set of new instructions in at least two fragments.

11. The method of claim 1 wherein receiving at least a portion of a set of new instructions at the target device comprises receiving the set of new instructions in at least two compressed fragments.

12. The method of claim 1, further comprising:
    requesting the set of new instructions from a host device.

13. The method of claim 1, further comprising:
    cold booting the processor on the target device after a last portion of the set of new instructions has been loaded to a respective block of the nonvolatile programmable memory of the target device, wherein the last portion of the set of new instructions is loaded to the respective block of the nonvolatile programmable memory after the start of the second period of time.

14. The method of claim 1 wherein the at least a portion of a set of new instructions is received at the target device before executing the new instruction loading executable on the target device.

15. A method of loading new instructions on a target device, the method comprising:
    providing a new instruction loading executable that includes a new instruction disable interrupt executable having at least one instruction to disable a respective interrupt function of a processor of a target device to the target device, wherein an existing operating system stored in a nonvolatile programmable memory and executed by the processor of the target device is suspended in response to the processor of the target device executing the least one instruction to disable a respective interrupt function of the processor of the target device; and
    providing a set of new instructions comprising the new operating system at the target device in at least three fragments, each respective fragment of the at least three fragments having a respective uncompressed size selected to fit into a respective block of the nonvolatile programmable memory of the target device, wherein the nonvolatile programmable memory of the target device is comprised of at least three blocks of equal size, and wherein each respective fragment is loaded into a respective block of the nonvolatile programmable memory of the target device.

16. The method of claim 15, further comprising:
determining the set of new instructions for the target device based at least in part on a characteristic of the target device.

17. The method of claim 15 wherein providing a set of new instructions at the target device in at least three fragments comprises providing the set of new instructions to the target device in at least three compressed fragments.

18. The method of claim 15 wherein providing a set of new instructions at the target device in at least two fragments is executed in response to a request generated by the new instruction loading executable executing on the target device.

19. A computing device, comprising:
a nonvolatile programmable memory comprising a plurality of blocks having an existing operating system stored therein;
a volatile memory capable of storing instructions and not having the existing operating system stored therein;
a processor operable to execute instructions stored in at least one of the volatile memory and the nonvolatile programmable memory;
wherein the nonvolatile programmable memory stores a new instruction loading executable that causes the processor to load a set of new instructions on the computing device, by:
disabling an interrupt function of the processor; and
concurrently while the interrupt function is disabled and while the volatile memory does not have the existing operating stored therein, and for at least three times, sequentially,
erasing a respective block of the nonvolatile programmable memory of the computing device, and
loading a respective portion of the set of new instructions to the respective erased block of the nonvolatile programmable memory on the computing device, and wherein the processor sequentially erases a respective block of the nonvolatile programmable memory and then loads a respective portion of the set of new instructions to the most currently erased respective block of the nonvolatile programmable memory prior to erasing a subsequent block of the of the nonvolatile programmable memory of the computing device.

20. The computing device of claim 19, wherein the new instruction loading executable includes a new instruction disable interrupt executable having at least one instruction to disable a respective interrupt function of the processor of the computing device, and wherein disabling an interrupt function of the processor includes suspending execution of the existing operating system of the computing device based on the processor executing the new instruction loading executable.

21. The computing device of claim 20 wherein the set of new instructions comprises a new operating system, wherein erasing a respective block of the nonvolatile programmable memory of the computing device includes erasing a respective portion of the existing operating system of the computing device, and wherein loading a respective portion of the set of new instructions to the respective erased block of the nonvolatile programmable memory on the computing device includes loading a respective portion of the new operating system to the respective erased block of the nonvolatile programmable memory on the computing device.

22. The computing device of claim 21 wherein the new instruction loading executable causes the processor to execute at least a portion of the new operating system without booting the computing device.

23. The computing device of claim 20 wherein the processor loads the set of new instructions on the computing device, by:
decompressing fragments of the set of new instructions before loading the portions of the set of new instructions to respective ones of the erased blocks of the nonvolatile programmable memory of the computing device.

24. The computing device of claim 23 wherein the processor loads the set of new instructions on the computing device, by:
storing the fragments in an operating space of the volatile memory of the computing device before decompressing fragments of the set of new instructions.

25. The computing device of claim 20 wherein the new instruction loading executable causes the processor to load the set of new instructions on the computing device further by:
cold booting the computing device after all of the portions of the set of new instructions have been loaded to the respective ones of the blocks of the nonvolatile programmable memory of the computing device.

26. A system for loading new instructions on target devices, the system comprising:
at least one memory storing at least one new instruction loading executable and at least one set of new instructions for loading onto target devices, the at least one new instruction loading executable includes a new instruction disable interrupt executable having at least one instruction to disable a respective interrupt function of a respective processor of a respective target device;
at least one communications port coupleable to provide communications with target devices; and
a processor operable to provide the set of new instructions in at least three fragments, each respective fragment of the at least three fragments having a respective uncompressed size selected to fit into a respective block of a nonvolatile programmable memory of an identified target device, wherein the nonvolatile programmable memory of the target device is comprised of at least three blocks of equal size.

27. The system of claim 26 wherein the processor is further operable to select the set of new instructions from a plurality of sets of new instructions, where each set of new instructions is previously divided into fragments of different sizes.

28. The system of claim 26 wherein the processor is further operable to divide the set of new instructions into fragments of a size that is based on a block size of the nonvolatile programmable memory of the identified target device.

29. A computer-readable recordable medium storing instructions for causing a processor of a computing device to facilitate loading new instructions on the computing device by:
disabling an interrupt function of the processor of the computing device; and
for at least three blocks of a flash memory of the computing device and at least three portions of a set of new instructions, sequentially,
erasing a respective block of the flash memory of the computing device, and loading a respective portion of the set of new instructions to the respective erased block of the flash memory on the computing device.

30. The computer-readable recordable medium of claim 29 wherein the instructions that cause the processor to facilitate loading new instructions on the computing device by disabling an interrupt function of the processor of the computing device includes instructions that cause the processor to facilitate loading new instructions on the computing device by suspending execution of an existing operating system by the processor, and wherein the portions of the set of new instructions are loaded to respective ones of the erased blocks of the flash memory on the computing device while the interrupt function of the processor of the computing device is disabled and the execution of the existing operating system is suspended.

31. The computer-readable recordable medium of claim 29 wherein the instructions cause the processor to facilitate loading new instructions on the computing device further by:
    decompressing a number of fragments of the set of new instructions before loading the portions of the set of new instructions to respective ones of the erased blocks of the flash memory on the computing device.

32. The computer-readable recordable medium of claim 31 wherein the instructions cause the processor to facilitate loading new instructions on the computing device further by:
    storing the fragments in an operating space of a volatile memory of the computing device before decompressing fragments of the set of new instructions.

33. The computer-readable recordable medium of claim 31 wherein the instructions cause the processor to facilitate loading new instructions on the computing device further by:
    cold booting the computing device after all of the portions of the set of new instructions have been loaded to the respective ones of the erased blocks of the flash memory of the computing device.

34. The computer-readable recordable medium of claim 29 wherein the set of new instructions comprises a new operating system and the computer-readable medium causes the processor to execute at least a portion of the new operating system without first booting the computing device.

35. A computer-readable recordable medium storing instructions for causing a computer to facilitate loading new instructions on target devices by:
    providing a new instruction loading executable to a target device having a nonvolatile programmable memory with an existing operating system of the target device stored therein, a volatile memory, a processor, and at least one bus that communicatively couples the nonvolatile programmable memory, the volatile memory and processor, the new instruction loading executable being such that when executed the new instruction loading executable loads a new operating system into the nonvolatile memory of the target device while the existing operating system is not copied into the volatile memory; and
    providing a set of new instructions at the target device in at least three fragments, each respective fragment of the at least three fragments having a respective uncompressed size selected to fit into a respective block of a flash memory of the target device, wherein the flash memory is comprised of at least three blocks of equal size, and wherein each respective fragment is loaded into a respective block of the flash memory of the target device.

36. The computer-readable recordable medium of claim 35 wherein respective blocks of the flash memory are of equal block size, and wherein the instructions cause the computer to facilitate loading new instructions on target devices further by:
    selecting the set of new instructions from a plurality of sets of new instructions based at least in part on the block size of the flash memory of the target device, where each set of new instructions is previously divided into fragments, the fragments of a first one of the plurality of sets of new instructions being of a different size than the fragments of a second one of the plurality of sets of new instructions.

37. The computer-readable recordable medium of claim 35 wherein the instructions cause the computer to facilitate loading new instructions on target devices further by:
    dividing the set of new instructions into fragments of a size that is based on a block size of the flash memory of an identified target device.

38. A method of loading new instructions on a target device having a nonvolatile memory, the method comprising:
    executing an existing operation system of a target device with a processor of the target device, the target device including a nonvolatile programmable memory having the existing operating system stored therein, a volatile memory being free of the existing operating system while the existing operating system is executed by the processor, the processor communicatively coupled to the nonvolatile programmable memory and the volatile memory;
    receiving a new instruction loading executable at the target device;
    receiving a number (N) of fragments of a set of new instructions comprising a new operating system of the target device at the target device, where N is at least three;
    executing the new instruction loading executable on the processor of the target device;
    suspending execution of the existing operating system at the target device based at least on disablement of an interrupt function at the target device via execution of the new instruction loading executable; and
    for N times sequentially,
        erasing a respective block of the nonvolatile programmable memory of the target device that stores a respective portion of the existing operating system of the target device, and
        loading a respective portion of the new operating system to a respective erased block of the nonvolatile programmable memory on the target device.

39. The method of claim 38, further comprising:
    after erasing at least one block of the nonvolatile program memory and prior to erasing another block of the nonvolatile program memory,
    determining whether to erase another block of the nonvolatile program memory.

40. The method of claim 39 wherein determining whether to erase another block of the nonvolatile program memory comprises determining whether all N fragments of the set of new instructions have been loaded into the nonvolatile program memory.

41. The method of claim 38, the method further comprising:
    cold booting a processor on the target device after all of the fragments of the set of new instructions have been loaded to the respective ones of the erased blocks of the nonvolatile programmable memory.

42. The method of claim 38 wherein the set of new instructions comprises a new operating system cold booting a processor on the target device after all of the fragments of the set of new instructions have been loaded to the respective ones of the erased blocks of the nonvolatile programmable memory.

43. The method of claim 37 wherein the new instruction loading executable is received during a first time period, and wherein executing the new instruction loading executable on the target device further comprises: executing the new instruction loading executable on the target device during a second period of time subsequent to the first period of time, and wherein for a time span extending from a start of the first period of time to a start of the second period of time, a processor of the target device is not booted.

* * * * *